United States Patent
Jessen et al.

(10) Patent No.: US 10,930,159 B1
(45) Date of Patent: *Feb. 23, 2021

(54) SMART PLATOONING OF VEHICLES

(71) Applicant: X Development LLC, Mountain View, CA (US)

(72) Inventors: Johan Ulrich Lewin Jessen, Mountain View, CA (US); Martin Friedrich Schubert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,719

(22) Filed: Aug. 12, 2019

Related U.S. Application Data

(63) Continuation of application No. 15/934,493, filed on Mar. 23, 2018, now Pat. No. 10,380,898, which is a
(Continued)

(51) Int. Cl.
  G08G 1/00 (2006.01)
  G01C 21/34 (2006.01)
  (Continued)

(52) U.S. Cl.
  CPC ............... G08G 1/22 (2013.01); B60F 1/00 (2013.01); B60L 53/30 (2019.02); B60L 53/68 (2019.02);
  (Continued)

(58) Field of Classification Search
  None
  See application file for complete search history.

(56) References Cited

U.S. PATENT DOCUMENTS

| 8,352,112 B2 | 1/2013 | Mudalige |
| 8,620,517 B2 | 12/2013 | Caveney et al. |

(Continued)

FOREIGN PATENT DOCUMENTS

| EP | 1569183 | 8/2005 |
| EP | 3341924 | 7/2018 |
| WO | WO2013006826 | 1/2013 |

OTHER PUBLICATIONS

'news.bbc.co.uk' [online] "'Road trains' get ready to roll," Nov. 9, 2009, [retrieved on Oct. 6, 2017] Retrieved from Internet: URL<http://news.bbc.co.uk/2/hi/technology/8349923.stm> 2 pages.

(Continued)

*Primary Examiner* — Adolf Dsouza
(74) *Attorney, Agent, or Firm* — Fish & Richardson P.C.

(57) ABSTRACT

A computing system may obtain, for each vehicle of a plurality of vehicles located within a location area, navigation data that indicates a travel route for the vehicle. Based on the navigation data for the plurality of vehicles, the computing system determines a subset of the plurality of vehicles that are within a threshold distance of each other and have respective travel routes that at least partially overlap. The computing system selects, based on a set of selection parameters, two or more vehicles among the subset of vehicles to form a platoon of vehicles that travel in a coordinated arrangement in proximity to each other during at least a portion of the respective travel routes of the selected vehicles. The computing system can direct the selected vehicles to form the platoon of vehicles.

20 Claims, 10 Drawing Sheets

Related U.S. Application Data continuation of application No. 15/287,343, filed on Oct. 6, 2016, now Pat. No. 9,940,840.

(51) Int. Cl.

| | |
|---|---|
| *B60L 58/12* | (2019.01) |
| *B60F 1/00* | (2006.01) |
| *B61B 3/00* | (2006.01) |
| *G05D 1/02* | (2020.01) |
| *G06Q 10/02* | (2012.01) |
| *G06Q 30/06* | (2012.01) |
| *G06Q 50/30* | (2012.01) |
| *B60L 53/68* | (2019.01) |
| *B60L 53/30* | (2019.01) |
| *H04L 29/08* | (2006.01) |

(52) U.S. Cl.
CPC .............. *B60L 58/12* (2019.02); *B61B 3/00* (2013.01); *G01C 21/34* (2013.01); *G01C 21/3407* (2013.01); *G05D 1/0291* (2013.01); *G06Q 10/02* (2013.01); *G06Q 30/06* (2013.01); *G06Q 50/30* (2013.01); *G08G 1/20* (2013.01); *B60L 2240/70* (2013.01); *H04L 67/12* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(56) References Cited

U.S. PATENT DOCUMENTS

| | | | |
|---|---|---|---|
| 8,649,941 | B1 | 2/2014 | Tsuda et al. |
| 8,855,835 | B2 | 10/2014 | Kumabe |
| 9,182,764 | B1 | 11/2015 | Kolhouse |
| 9,396,661 | B2 | 7/2016 | Okamoto |
| 9,582,006 | B2 | 2/2017 | Switkes et al. |
| 9,645,579 | B2 | 5/2017 | Switkes et al. |
| 2009/0271050 | A1 | 10/2009 | Niki et al. |
| 2010/0256836 | A1* | 10/2010 | Mudalige ............ G08G 1/163 701/2 |
| 2010/0256852 | A1 | 10/2010 | Mudalige |
| 2013/0030606 | A1 | 1/2013 | Mudalige et al. |
| 2013/0325306 | A1 | 12/2013 | Caveney et al. |
| 2017/0227972 | A1 | 8/2017 | Sabau |

OTHER PUBLICATIONS

'www.cnet.com' [online] "Platooning: The future of freeways is lining up," Stephen Shankland, Sep. 3, 2013, [retrieved on Oct. 6, 2017] Retrieved from Internet: URL<https://www.cnet.com/news/platooning-the-future-of-freeways-is-lining-up/> 5 pages.

'www.economist.com' [online] "The Connected Car," The Economist, Jun. 4, 2009, [retrieved on Oct. 6, 2017] Retrieved from Internet: URL< http://www.economist.com/node/13725743> 5 pages.

'www.en.wikipedia.org' [online] "Platoon (automobile)," Last Updated on: Sep. 25, 2017 [retrieved on Oct. 6, 2017] Retrieved from Internet: URL<https://en.wikipedia.org/wiki/Platoon_(automobile), 5 pages.

'www.en.wikipedia.org' [online] "Safe Road Trains for the Environment," Last Updated on: Apr. 26, 2017, [retrieved on Oct. 6, 2017] Retrieved from Internet: URL<https://en.wikipedia.org/wiki/Safe_Road_Trains_for_the_Environment> 4 pages.

'www.princeton.edu' [online] "SARTRE: Safe Road Trains for the Environment," Arturo Davila et al. Sep. 21, 2010, [retrieved on Oct. 6, 2017] Retrieved from Internet: URL<https://www.princeton.edu/~alaink/Orf467F10/PRT@LHR10_Conf/Arturo_Davila_prez_SafeTrains.pdf> 34 pages.

'www.webcitation.org' [online] "About the SARTRE project," Jan. 18, 2011, [retrieved on Oct. 6, 2017] Retrieved from Internet: URL<http://www.webcitation.org/5vpeyHyE3> 1 page.

'www.wired.com' [online] "Autonomous Cars Will Require a Totally New Kind of Map," Greg Miller, Dec. 15, 2014, [retrieved on Oct. 6, 2017] Retrieved from Internet: URL<https://www.wired.com/2014/12/nokia-here-autonomous-car-maps/> 7 pages.

Bagloee et al. "Autonomous vehicles: challenges, opportunities, and future implications for transportation policies," Journal of Mod. Transport. 24(4), Aug. 29, 2016, 20 pages.

Deng et al. "Task Allocation and Path Planning for Collaborative Autonomous Underwater Vehicles Operating through an Underwater Acoustic Networks," Journal of Robotics, vol. 2013, Article 483095, Feb. 13, 2013, 16 pages.

Hu et al. "Research and realization of optimum route planning in vehicle navigation systems based on a hybrid genetic algorithm," Proceedings of the Institution of Mechanical Engineers, Part D: Journal of Automobile Engineering 222, No. 5, May 1, 2008, 7 pages.

\* cited by examiner

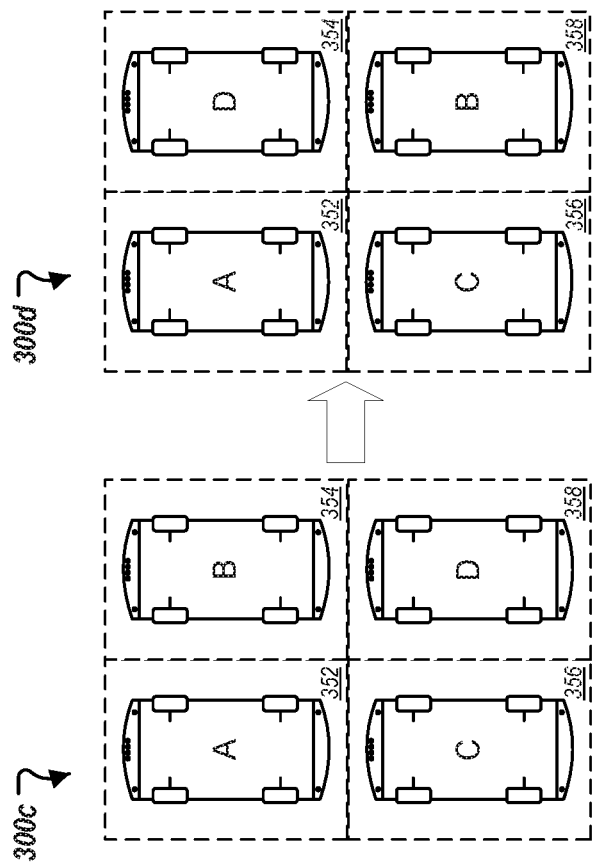
FIG. 3C
FIG. 3D
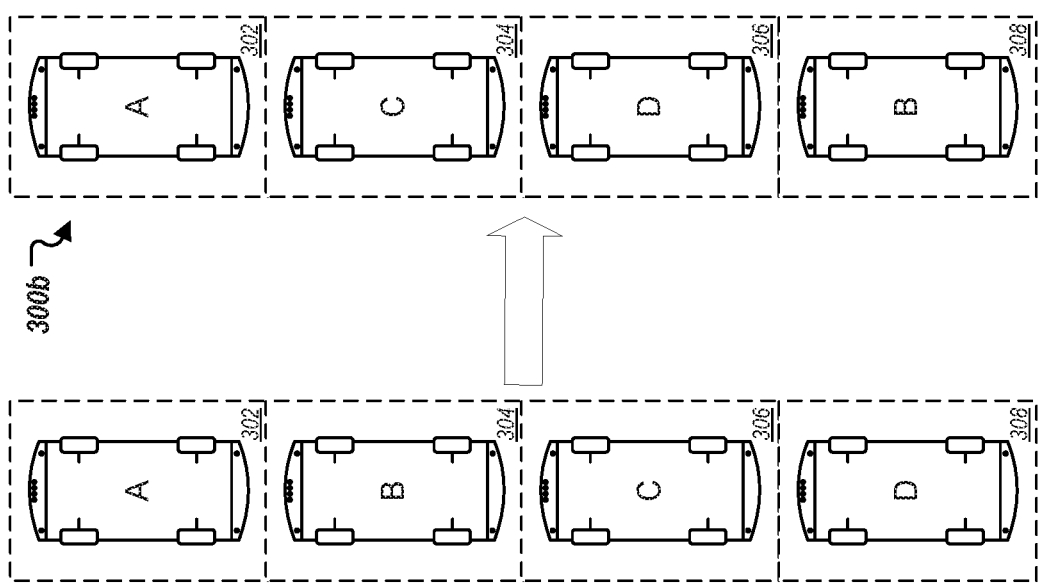
FIG. 3A
FIG. 3B

900

```
┌─────────────────────────────────────────────────────────────┐
│ Determine configuration of existing platoon and arrangement │
│ of vehicles in the platoon                                  │
│                                                         902 │
└─────────────────────────────────────────────────────────────┘
                              │
                              ▼
┌─────────────────────────────────────────────────────────────┐
│ Identify a first vehicle that is currently in a first       │
│ position of the platoon that has a low separability rating  │
│                                                         904 │
└─────────────────────────────────────────────────────────────┘
                              │
                              ▼
┌─────────────────────────────────────────────────────────────┐
│ Determine that the platoon is within a threshold distance   │
│ of a planned separation location for the first vehicle      │
│                                                         906 │
└─────────────────────────────────────────────────────────────┘
                              │
                              ▼
┌─────────────────────────────────────────────────────────────┐
│ In response, move the first vehicle from the first position │
│ to a second position of the platoon that has a higher       │
│ separability rating                                         │
│                                                         908 │
└─────────────────────────────────────────────────────────────┘
                              │
                              ▼
┌─────────────────────────────────────────────────────────────┐
│ Determine that the platoon is currently located at the      │
│ planned separation location for the first vehicle           │
│                                                         910 │
└─────────────────────────────────────────────────────────────┘
                              │
                              ▼
┌─────────────────────────────────────────────────────────────┐
│ Separate the first vehicle from the platoon                 │
│                                                         912 │
└─────────────────────────────────────────────────────────────┘
```

FIG. 9

# SMART PLATOONING OF VEHICLES

TECHNICAL FIELD

This disclosure generally relates to techniques for directing vehicles to travel in a coordinated manner, such as in groups referred to herein as platoons.

BACKGROUND

Population growth in and around urban centers has, in many instances, strained the capacity of transportation infrastructure in these areas. Construction of new infrastructure and maintenance of existing infrastructure can be expensive and slow. As a result, existing infrastructure in some areas is sometimes unable to adequately meet the transportation demands of communities in these areas. With respect to roadways, one result of insufficient capacity is frequent, and often frustrating, traffic congestion. Autonomous vehicles, which use sensed information about their surroundings to drive without human guided controls, have been developed as one transportation option for existing roadways.

SUMMARY

This document generally describes techniques for forming and managing platoons of vehicles, e.g., automobiles, robots, and unmanned aerial vehicles.

Some implementations of the subject matter described herein include a computer-implemented method. The method can include obtaining, by a computing system and for each vehicle of a plurality of vehicles located within a location area, navigation data that indicates a travel route for the vehicle. Based on the navigation data for the plurality of vehicles, the computing system determines a subset of the plurality of vehicles that are within a threshold distance of each other and have respective travel routes that at least partially overlap. The computing system selects, based on a set of selection parameters, two or more vehicles among the subset of vehicles to form a platoon of vehicles that travel in a coordinated arrangement in proximity to each other during at least a portion of the respective travel routes of the selected vehicles. The computing system can direct the selected vehicles to form the platoon of vehicles.

These and other implementations may optionally include one or more of the following features.

The computing system may perform operations that include receiving an indication that the selected vehicles have formed the platoon; receiving a request for a second vehicle that is not currently a part of the platoon to join the platoon; determining values for one or more platoon parameters that are estimated to result from the second vehicle joining the platoon; comparing the estimated values for the one or more platoon parameters to acceptable values for the one or more platoon parameters; and determining whether to accept or reject the request for the second vehicle to join the platoon based on whether the estimated values for the one or more platoon parameters are among the acceptable values for the one or more platoon parameters.

The one or more platoon parameters can include at least one of a number of vehicles in the platoon, a number of permissible re-configurations of the platoon, a number of permissible re-arrangements of the platoon, scheduled times of arrival of the platoon at one or more locations, a level of power consumption of one or more vehicles in the platoon, a traveling speed of the platoon, or scheduled separation times for one or more vehicles from the platoon.

The computing system can select a configuration of the platoon. The selected configuration may specify a plurality of vehicle positions for vehicles in the platoon and an arrangement of the vehicle positions with respect to each other. The system may assign each of the selected vehicles to a different one of the plurality of vehicle positions. Directing the selected vehicles to form the platoon can include transmitting information that indicates the respective vehicle positions to which each of the selected vehicles is assigned in the selected configuration.

The selected vehicles can be assigned to different ones of the plurality of vehicle positions based at least on estimated power requirements of the selected vehicles.

The computing system can assign the selected vehicles to different ones of the plurality of vehicle positions based at least on a separation schedule that indicates at least one of times or locations at which one or more of the selected vehicles are scheduled to separate from the platoon.

The computing system can identify, while the selected vehicles are traveling in the assigned positions of the platoon, that the platoon is currently located within a threshold distance of a location at which a first vehicle of the selected vehicles in the platoon is scheduled to separate from the platoon. In response to identifying that the platoon is currently located within the threshold distance of the location at which the first vehicle is scheduled to separate from the platoon, the computing system may direct the first vehicle to move from a first position of the platoon to a different, second position of the platoon to facilitate subsequent separation of the first vehicle from the platoon.

At least one of the selected vehicles is an autonomous vehicle that is configured to be driven on public roadways without human-guided control of the at least one of the selected vehicles.

A first vehicle of the selected vehicles can include a base unit and a pod unit. The base unit can include (i) a drivetrain and (ii) a motor or an engine for generating automotive power for the first vehicle. The pod unit can include a human-occupiable vehicle cabin. The pod unit can be configured to be detachably connected to the base unit.

The set of selection parameters by which the computing system selects the two or more vehicles to form the platoon of vehicles can include at least one of power requirements of the vehicles, an estimated length or duration of overlapping portions of the respective travel routes of the vehicles, or aerodynamic characteristics of the vehicles.

The navigation data for each vehicle of the plurality of vehicles can indicate a current travel route that the vehicle is currently traveling, a planned travel route that the vehicle is planned to travel, or both.

Some implementations of the subject described herein include a computing system for managing vehicles in platoons. The system can include a navigation subsystem, a vehicle status monitoring subsystem, a platoon management apparatus, and a server subsystem. The navigation subsystem can maintain navigation data for a set of vehicles located within a location area. The navigation data for each vehicle can indicate a travel route for the vehicle. The travel route can be currently traveled by the vehicle or can be planned to be traveled by the vehicle. The vehicle status monitoring subsystem can monitor, for each vehicle of the set of vehicles, a current status of the vehicle. The current status of the vehicle can indicate a current location of the vehicle. The platoon management apparatus can select, based on evaluation of the navigation data and information representing the current statuses of the set of vehicles, two or more vehicles from the set of vehicles to form a platoon of vehicles that travel in a coordinated arrangement in proximity to each other during at least a portion of the respective travel routes of the selected vehicle. The server subsystem can direct the selected vehicles to from the platoon of vehicles.

These and other implementations can optionally include one or more of the following features.

The vehicle status monitoring subsystem may further be configured to monitor, for each vehicle of the set of vehicles, a power requirement of the vehicle. The power requirement of the vehicle may represent a ratio of an estimated level of power required for the vehicle to travel a predetermined distance and a level of power reserve on the vehicle.

The platoon management apparatus may further be configured to select the two or more vehicles from the set of vehicles to form the platoon of vehicles based on the power requirements of at least some of the vehicles in the set of vehicles.

The platoon management apparatus may further be configured to determine an arrangement of the selected vehicles with respect to each other in the platoon based at least on the power requirements of the selected vehicles.

The system may further include a data repository. The data repository may store data representing a vehicle separation schedule. The vehicle separation schedule may indicate at least one of times or locations at which one or more of the selected vehicles are scheduled to separate from the platoon.

The platoon management apparatus may further be configured to determine an arrangement of the selected vehicles with respect to each other in the platoon based at least on the times or locations at which particular ones of the selected vehicles are scheduled to separate from the platoon, as indicated by the vehicle separation schedule.

The platoon management apparatus may further be configured to determine whether to permit a second platoon of multiple vehicles to join the platoon of vehicles based on at least one of power requirements of vehicles in the platoon or estimated changes in arrival times at one or more locations for one or more vehicles in the platoon that would result from joining the second platoon.

Some implementations of the subject matter described herein may include a computer-implemented method. The method may include identifying, by a first computing system installed on a first vehicle, a group of second vehicles that are currently traveling, or are planned to travel, as a platoon of vehicles during at least a portion of a travel route of the first vehicle. A platoon may be a group of vehicles that travel in a coordinated arrangement in proximity to each other during at least a portion of respective travel routes of the vehicles in the group. The first computing system may send, to a second computing system that at least partially controls the platoon of vehicles, a request for the first vehicle to join the group of second vehicles in the platoon. The first computing system may receive a response from the second computing system that indicates acceptance or rejection of the request for the first vehicle to join the group of second vehicles in the platoon. Based on identifying that the response indicates acceptance of the request, a computing system may invoke a procedure to join the first vehicle to the group of second vehicles in the platoon.

These and other implementations may optionally include one or more of the following features.

The first computing system may automatically generate and send the request for the first vehicle to join the group of second vehicles in the platoon in response to identifying that the group of second vehicles are currently traveling, or are planned to travel, as the platoon during the at least the portion of the travel route of the first vehicle.

The second computing system may be installed on one of the vehicles in the group of second vehicles. Sending the request from the first computing system installed on the first vehicle to the second computing system may include using a peer-to-peer communication protocol for exchanging messages between computing systems installed on vehicles.

In some implementations, one or more non-transitory computer-readable devices may have instructions stored thereon that, when executed by one or more computers or processors, cause the one or more computers or processors to perform operations of the methods disclosed herein. The computer-readable devices may be part of a computing system that includes the one or more computers or processors.

Various features and advantages of the foregoing subject matter is described below with respect to the figures. Additional features and advantages are apparent from the subject matter described herein and the claims.

DESCRIPTION OF DRAWINGS

FIGS. 3A-3D depict respective configurations and arrangements of platooning vehicles.

FIG. 9 is a flowchart of an example process for directing separation of a vehicle from a platoon.

DETAILED DESCRIPTION

Figure 1:
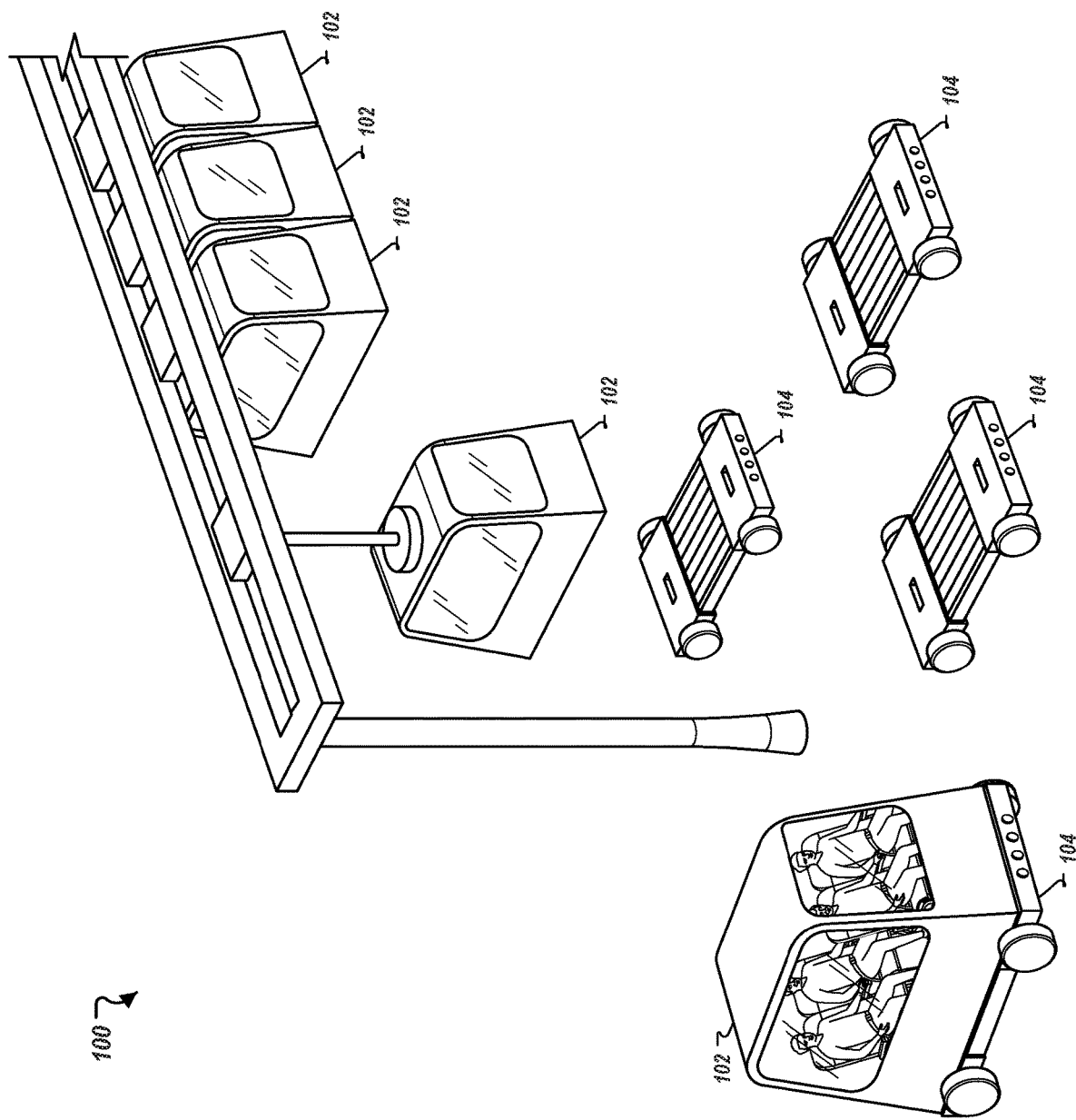
FIG. 1 illustrates an example set of modular vehicles located at an exchange station for an elevated rail network.

This disclosure describes systems, methods, apparatus, and other techniques for coordinating actions of self-propelled vehicles, such as by traveling in a platoon formation. In a platoon formation, vehicles may travel together in close proximity to each other in a pre-defined arrangement. In certain instances, platooning may be preferable to non-coordinated or independent travel. For example, a platoon may realize aerodynamic benefits that reduce the drag experienced by one or more vehicles (e.g., street vehicles, air vehicles, water vehicles) in the platoon. With reduced drag, vehicles may achieve comparatively better power efficiency than they otherwise would if not in a platoon formation. Moreover, in some implementations, platooning vehicles may form physical connections between each other that permit the transfer of electrical power from one or more first vehicles to one or more second vehicles, e.g., to facilitate charging of the second vehicles during travel. Platoons may also promote more efficient use of public roadways. For example, by grouping vehicles that have overlapping travel routes, travel decisions for the vehicles can be made that promote not only the travel interests of individual vehicles, but also the travel interests of groups of vehicles that make for more efficient use of public roadways.

In general, the techniques discussed herein are applicable to various types of self-propelled vehicles. A self-propelled vehicle is generally a vehicle that is configured to propel itself for a distance through a force other than human motive force. A self-propelled vehicle generally has a self-contained power supply and a motor or engine that is powered by the power supply to drive the vehicle in desired directions. By way of example, the self-propelled vehicles discussed throughout FIGS. 1-9 are automotive street vehicles. An automotive street vehicle may be a passenger vehicle, such as a sedan, sport utility vehicle, pickup truck, or the like, or may be a cargo vehicle such as a lorry, flatbed trailer-truck, or the like. However, the techniques may also be applicable to other types of self-propelled vehicles that utilize shared traffic channels (e.g., public roadways, airspace). For example, drones or other types of aircraft may be subject to platooning. In some implementations, robots may be subject to platooning. To be capable of platooning, a self-propelled vehicle generally is susceptible to control at least in part by one or more external systems. In some implementations, a central controller may include a platoon manager that directs a group of vehicles to form a platoon and manages various aspects of the platoon during travel. The vehicles may thus include a communications system that communicates with the central controller, e.g., to receive platooning instructions and to report vehicle status information to the central controller. The vehicles may also be capable of peer-to-peer communication directly with each other. In these implementations, platoon management may be performed by the vehicles themselves, rather than or in addition to management by a central controller that is external to the vehicles.

Self-propelled vehicles may also be autonomous, in that they do not require human-guidance to navigate a travel route. An autonomous street vehicle, for example, may include sensors and computing systems that collect and process information about the vehicle's environment, and that, based on such information, control the vehicle's steering, acceleration, and braking in order to autonomously drive the vehicle along a pre-defined route. In some implementations, autonomous driving systems may be provided in vehicles that are configured for platooning, except that the autonomous driving systems may facilitate coordinated travel of a vehicle as part of a group of vehicles rather than or in addition to as an individual.

Referring to FIG. 1, an example automotive vehicle 102 is shown, which may be configured to travel in platoons according to the techniques described herein. The example vehicle 102 is a "modular" vehicle that, e.g., provides interchangeability of pod units with bases. The base and pod units of a vehicle can each include respective components that collectively provide complete functionality for an assembled vehicle to perform various tasks such as navigating and transporting humans and other cargo. For example, a base unit may include the core components for powering the vehicle (e.g., drivetrain, fuel or battery, motor or engine) and a navigational computing system, while the pod unit provides a cabin to accommodate passengers and cargo. Different pods can be removably secured to base units to form complete vehicles, and pods can later be separated from the base units at particular times. As such, bases may be configured to carry different pod units and pod units may be switched among base units and other transportation modalities, e.g., according to instructions from a central computing system that manages operation of a fleet of modular vehicles in one or more areas.

In the scenario illustrated by FIG. 1, a collection of base units 102 and pod units 104 are depicted as being located at an exchange station 100. An exchange station 100 is generally a designated location within a geographic area (region) in which base units 102 and pod units 104 can be safely connected to each other, and in which complete vehicle units can be safely separated into their constituent components. The exchange station 100 also acts as a switching point in a transportation system, e.g., a location where pods are re-directed to different transportation modalities, new combinations of vehicle units are formed, passengers and cargo are loaded into or unloaded from pod units, or a combination of these.

The exchange station 100 can provide a terminal for loading and unloading pods from an elevated rail network. The rail network can provide high-speed transportation for commuters between two or more distant locations. For example, a passenger from the suburbs may be driven by a modular street vehicle to the exchange station 100. Equipment at the exchange station 100 may automatically detach the pod from the base unit of the vehicle and lift and secure the pod to the elevated rail network for efficient transport directly to a metropolitan area near a location where the passenger works. The same pod may then be connected to a different base unit at a second exchange station at a distal location of the elevated rail network, such as near the passenger's work location, for example. The vehicle formed from the new base-pod combination can then drive the passenger the final leg of the route to the passenger's work location.

In some implementations, pod units 102 in a fleet may have different configurations from each other and base units 104 in the fleet may also have different configurations from each other. A given base unit 104 may be capable of connecting to differently configured pod units 102. Likewise, a given pod unit 102 may be capable of connecting to differently configured base units 104. To ensure compatibility of a particular base-pod combination, the central computing system may maintain a database storing data representing a list of available pod configurations, a list of available base configurations, and acceptable combinations thereof. Authorized computing systems may query the database to determine whether a pod having a particular combination can be connected to a particular base. If the components are deemed compatible, the computing system may then assign the pod 102 to the base 104 and instructions can be transmitted (e.g., wirelessly) to the pod 102 and base 104 to cause or approve a connection of the pod and base units 102, 104. As discussed further below, a pod 102 and base 104 that have been, or are about to be connected, can also communicate to verify compatibility of the respective components (e.g., pod 102 and base 104), to adjust aspects of the respective components that may be necessary to facilitate a connection between the two, and to confirm that a safe and proper connection has been made between the pod 102 and the base 104.

When connected, a pod 102 and base 104 can provide a fully functional street vehicle (e.g., an automobile). The pod 102 and base 104 can include respective components that collectively enable the vehicle operation. In some implementations, the pod 102 includes a housing that defines a vehicle cabin or other enclosure for carrying passengers or freight. Pods 102 that are arranged to carry human passengers can include, within the cabin, one or more seats, a navigation console that provides an interface for passengers to input and modify navigation information (e.g., route destinations, points of interest), driving controls (e.g., steering, acceleration, and brake controls), environmental controls, multimedia controls, and instrumentation (e.g., speedometer, fuel level indicator, battery charge indicator). The pod 102 may further include one or more doors that provide entry and exit points for passengers and cargo, a cargo compartment, and windows.

In some implementations, sensors may be fixed to the pod 102 and may generate signals representative of various conditions of the pod 102, the environment of the pod 102, or both. For example, a pod 102 may include load sensors and locking sensors for verifying safe connection of the pod 102 to a base 104, and may further include imaging sensors, laser detectors, and ultrasonic sound transducers to generate signals as input to an autonomous driving computing system. In some implementations, the pod 102 may include a battery or other electrical power supply so that standalone systems in the pod 102 (e.g., environmental controls, multimedia systems) can function even when the pod 102 is not connected to a base 104. The pod 102 may further include one or more locks for securing the pod 102 to the base 104.

The base unit 104 includes a chassis, which is configured to support the pod unit 102 atop the base unit 104 and to facilitate a separable connection between the pod unit 102 and base unit 104. The base unit 104 can include two, three, four, or more wheels, a drivetrain, a gasoline engine or electric motor (or a hybrid gasoline-electric engine), a fuel tank (e.g., for gasoline to power an engine), a battery pack (e.g., to power the electric motor), autonomous driving sensors, modular connection sensors, or a combination of these. In some implementations, the base unit 104 can include a heating and air conditioning assembly that forces heated or cooled air into a pod unit 102 according to current environmental settings when the pod unit 102 is connected to the base unit 104.

In some implementations, the components of the base unit 104 are sufficient to allow for autonomous driving of the base unit 104, either with or without the pod unit 102 connected to the base unit 104. For example, the computing system on the base unit 102 may include an autonomous driving computing subsystem (ADCS) that processes navigation data and sensor data from the autonomous driving sensors to control steering, acceleration, and braking components of the base unit 104 to drive to particular destinations. The ADCS may include a wireless network interface that communicates over a high-speed wireless network with a central computing system remotely located from the base unit 104. The ADCS uses the wireless network interface to report location and status information associated with the base unit 104 to the central computing system, and to receive messages from the central computing system. The messages received from the central computing system may include, for example, navigation instructions for causing the base unit 104 to drive to particular destinations, optionally, at specified times and along specified routes.

The messages may also include pod-assignment information that identifies a particular pod unit 102 that has been assigned to connect with the base unit 104. Upon receiving pod-assignment information, the base unit 104 may locate the identified pod unit 102 and physically navigate to a location where the base unit 104 can be connected to the pod unit 102 (e.g., an exchange station 100).

In some implementations, the division of vehicle components among modular, separable pod units 102 and base units 104 can provide one or more advantages. To start, maintenance and repair of the respective units 102, 104 may be more readily carried out when the pod units 102 and base units 104 are separated from each other, e.g., due to improved accessibility of components of the units 102, 104. Additionally, a central computing system can, in some instances, more efficiently transport passengers and cargo among various locations. For example, the central computing system may monitor current transportation demand and forecast demand within a target region (e.g., a city). The system may then select combinations of pods 102 and bases 104 that, when connected, result in favorable vehicle characteristics to efficiently meet the demand.

Similarly, idling times of modular vehicles may be reduced as compared to conventional, non-modular vehicles. For example, a passenger may call a modular vehicle to transport the passenger from home to work. One segment of the passenger's route may involve high-speed transport via a rail network. A base unit 104 may carry the passenger's pod 102 to an exchange station 100, where the pod 102 is disconnected from the base unit 104 and placed on the rail network. Rather than idling in a non-use state while the pod 102 is on the elevated rail network, the base unit 104 can immediately be assigned a new pod unit 102 to pair with and transport. When demand is low and the fleet capacity is greater than what is necessary to meet current demand, the central computing system may direct a portion of the available pod units 102, base units 104, or both, in the fleet to designated storage locations so that the currently deployed fleet at any given time is optimized to meet current and projected demand.

Figure 2:
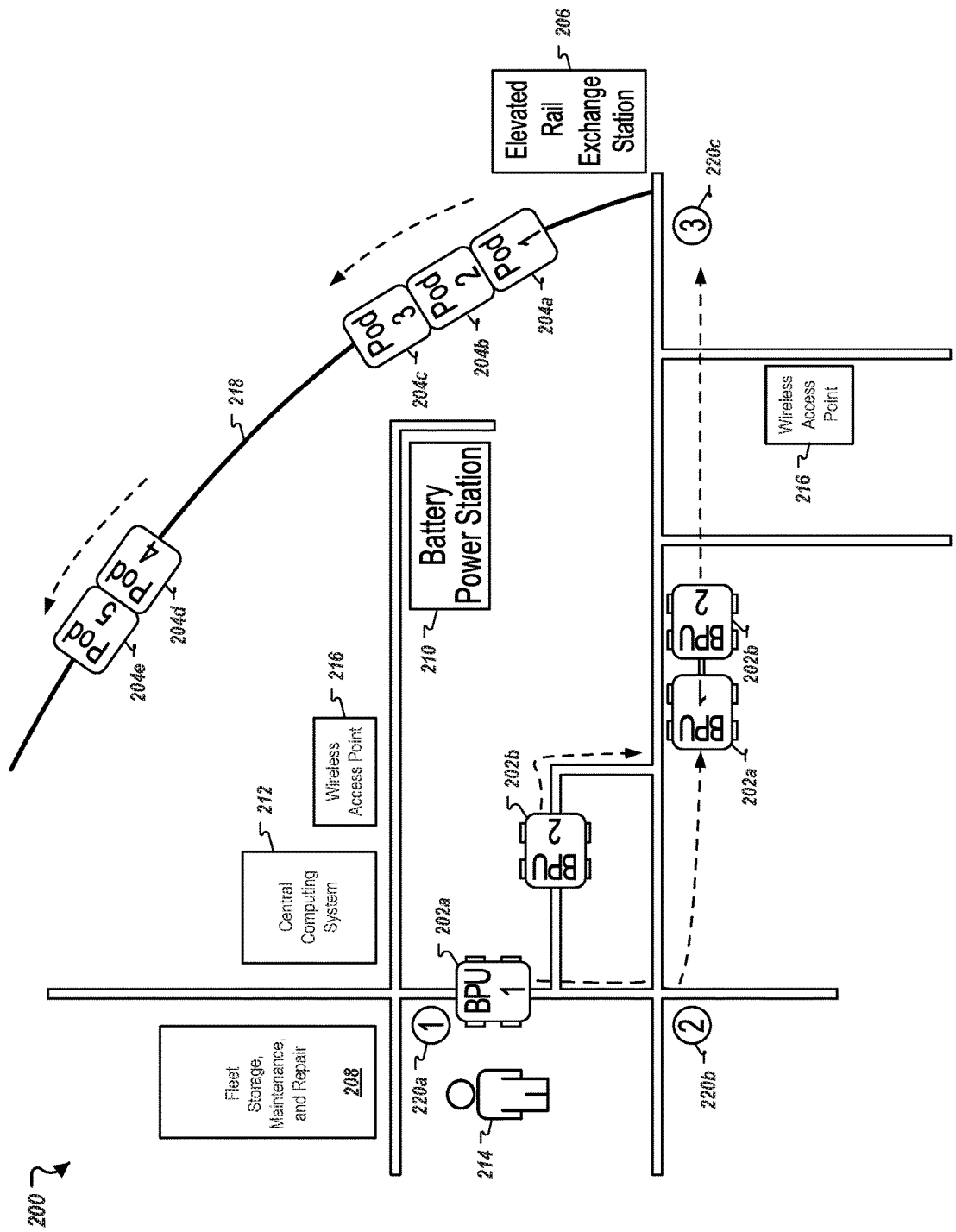
FIG. 2 illustrates a fleet of modular vehicles deployed within a geographic area and associated facilities within the area.

Referring to FIG. 2, a conceptual diagram is shown of a fleet of modular vehicles that have been deployed within a geographic region 200, such as a city, a residential district, or a business district of a city. The modular vehicles 202a-202b represented in FIG. 2 each includes one or more base units and one or more pod units that are removably connected to the one or more base units. In some implementations, the modular vehicles of FIGS. 1, 3, 4, and 5, including their respective pod and base units, may be deployed in the geographic region 200 and are represented by the modular vehicles 202a-202b in FIG. 2.

The geographic region 200 includes various infrastructure to support operation of the fleet of vehicles. The infrastructure can include, for example, a storage, maintenance, and repair facility 208, a battery power station 210, an elevated rail exchange station 206, a facility for a central computing system 212, and wireless access points 216. Depending on the size and transportation demands of a particular region 200, the region 200 may include only a subset of the facilities 206-212 or may include multiple ones of all or some of the facilities 206-212. For example, a highly populous region 200 may require two, three, or more storage, maintenance, and repair facilities 208, many wireless access points 216, and a network of multiple battery stations 210.

In some implementations, the storage, maintenance, and repair facility 208 is a designated location for storage, maintenance, and repair of pod units, base units, and other components and equipment associated with modular vehicles. The facility 208 may include one or more hangars or outdoor spaces for vehicle storage, and one or more garages for vehicle maintenance and repair. In some implementations, pods and bases that are out of service or temporarily unused may be routed to and stored at the facility 208. During peak times when transportation demand increases, additional vehicles may be deployed from the facility 208 to various locations across the region 200. The facility 208 may include equipment for connecting pod units to base units and for removing pod units from base units. Therefore, particular combinations of pods and bases can be assembled at the facility 208 according to instructions from the central computing system 212 or instructions from users or other computing systems. Generally, the system prevents base units from driving on public streets of the region 200 without a pod unit connected to the base unit. The central computing system 212, or local computing systems at the facility 208 or on a given base unit, may enforce rules that restrict the base unit from leaving the premises of the facility 208 without a pod unit connected to the base unit, unless an exception applies such as an emergency or a manual override command.

In some implementations, one or more battery stations 210 may be located throughout the region 200. Battery stations 210 are facilities that include battery chargers for pod units, base units, or both. In some implementations, battery packs on electrically powered pods and bases can be readily removed from their host pod or base unit and swapped at a battery station 210 for a fully charged battery. The availability of battery stations 210 for swapping depleted batteries with charged batteries can reduce incidences of "dead" vehicles on public roadways, and can increase the longevity of vehicle use before the vehicle is taken out of service for an extended period of time, e.g., for repairs and maintenance. In some implementations, a collection of battery stations 210 may be distributed throughout the region 200 so that stops for battery swaps can be conveniently made. For example, the vehicle's autonomous driving computing subsystem (ADCS) may constantly monitor the current battery charge of the vehicle. When the charge falls below a pre-defined threshold charge level, the ADCS may automatically detour from a route and navigate to the closest battery station 210. The threshold charge level may vary based on factors such as a projected depletion rate, distance of the vehicle to the closest available battery station 210, and traffic conditions.

The exchange station 206 is generally a designated location within region 200 in which base units and pod units can be connected to each other, and in which complete vehicle units can be safely disassembled by removal of pod units from their corresponding base units. In some implementations, an exchange station 206 serves as a switching point for the transportation system, e.g., a location where bases are connected with new pods, where passengers or cargo switch to different pods, where pods are connected to different transport modalities (e.g., transition from rail to street travel or vice versa), or a combination of these. In the example of FIG. 2, the exchange station 206 includes an access point to an elevated rail network 218. The rail network 218 may connect the region 200 to other population centers located a distance from the region 200. In some implementations, the rail network 218 provides a high speed and power efficient option for transporting greater numbers of pods to distant locations in faster times than could be done by driving the pods on individual base units from the region 200 to the distant locations. Moreover, as pods are disconnected from bases for departures on the rail network 218, the separated bases can then be connected to pods that have arrived at the exchange station 206 via the rail network 218 in the opposite direction. The vehicles formed from the new base-pod pairs can depart the exchange station 206 and drive to various locations within region 200.

In some implementations, the region 200 includes a central computing system 212 that manages region-wide aspects of the modular vehicle transportation system. The central computing system 212 can include one or more computers in one or more locations. Although the central computing system 212 is shown in FIG. 2 as being physically located in the same region 200 that it manages, other arrangements are also possible. For example, the central computing system 212 may include computers located entirely outside of the region 200, or may include some computers within the region 200 and other computers outside of the region 200. In general, the central computing system 212 may communicate over one or more wireless networks with pods, bases, and other components of modular vehicles located within the managed region 200. The central computing system 212 may also communicate with respective local computing systems at the storage, maintenance, and repair facility 208, the battery power station 210, exchange station 206, and other facilities and equipment associated with the transportation system. The region 200 may include a network of wireless access points having wireless transmitters and receivers for exchanging over-the-air messages between the central computing system 212 and local components such as bases, pods, and fixed facilities.

The central computing system 212 is configured to coordinate activities of pods, bases, and modular vehicle units within the region 200. In some implementations, the central computing system 212 is configured to receive and process trip requests from users within the region 200. In response to the trip requests, the system 212 can deploy vehicles to transport passengers or cargo according to parameters of the requests. A trip request can include a message transmitted from a user device (e.g., a smartphone, tablet computer, notebook computer, desktop computer) to the central computing system 212 that represents a request to reserve one or more modular vehicles for transporting passengers or cargo to particular locations within one or more transportation regions. The trip request can be parameterized with values that represent characteristics of the requested trip such as cargo type (e.g., passengers, consumer goods, commercial goods, construction material, animals), pickup time and location, destination, route preferences, pod preferences, autonomous or human-operated driving preference, or a combination of two or more of these. Pod preferences generally indicate preferred characteristics or configurations of pod units that the requesting user prefers for the trip. For example, a user may specify in a trip request an identifier for a particular pod that is privately owned by the user, to cause the system 212 to deploy for the user a modular vehicle that includes a base and the user's private pod. In some implementations, pod preferences may indicate a preference for particular pod configurations such as seating capacity of the pod, whether the pod may be shared with other passengers during the requesting user's trip, and preferences for amenities (e.g., environmental control options, radio and multimedia options).

Upon receiving a trip request, the central computing system 212 can assign assets (e.g., a pod-base pair) to utilize for the trip and deploys those assets in satisfaction of the request. The assigned assets may be selected from among sets of multiple assets that are available for the trip. For example, the central computing system 212 may determine a particular base-pod combination for the requested trip, transmit instructions for causing connection of the selected base and pod to assemble an operational vehicle, and for causing the vehicle to be sent to the requested pickup location. Passengers or other cargo can then be loaded into the vehicle, and the vehicle can transport the passengers or cargo to the target destination.

In some implementations, the central computing system 212 is configured to set parameters of both planned and ongoing trips so as to optimize one or more region-wide transportation metrics. As one example, the system 212 may use real-time location information that has been reported from vehicle computing systems and passengers' vehicles to constantly monitor current traffic conditions of roadways in the region 200. The system 212 may actively set and adjust navigational routes for deployed vehicles that are under control of the system 212 in order to optimize use of available roadways. For instance, during peak traffic times, the system 212 may divert some vehicles from primary roadways (e.g., highways) to secondary roadways (e.g., city streets) to prevent or avoid congestion on the highways.

The system 212 may also monitor traffic conditions and transportation demand over time to construct a predictive model that forecasts traffic conditions and transportation demand from users. The system 212 may use the model to meet forecasted transportation demand and optimize traffic conditions. For example, the system 212 may identify that a large-scale event (e.g., a professional football game) is scheduled to occur in the near future. In anticipation of the event, the system 212 may generate estimates of the demand for each of multiple configurations of modular vehicles. Based on the estimated demand for various configurations of vehicles, the system 212 may pre-select particular pods and base units to form vehicles that meet the demand. The system 212 may then pre-deploy the vehicles to particular locations in the region 200 that the system 212 estimates, based on the model, demand is most likely to occur, e.g., at the stadium, hotels, airports, and restaurants in vicinity of the stadium. In this manner, the system 212 may make pre-connected modular vehicles ready to respond to trip requests as requests are received at times associated with the event.

In some implementations, the central computing system 112 may coordinate the activities of two or more vehicles to meet objectives deemed to improve passengers' transport experiences. For many commuters, positive transport experiences result in part from minimizing the amount of time required to reach a target destination and minimizing the amount of "stall time" during which a commuter's progress in moving toward the target destination is temporarily slowed or stopped. Stalls can occur, for example, on roadways as a result of traffic congestion or at switching points where a passenger switches vehicles or transportation modalities. To reduce stall time, the central computing system 112 can dynamically adjust the routes and speeds of vehicles throughout the region 200, e.g., to avoid occurrences of traffic congestion and to reduce switching delays.

For example, the central computing system 212 may plan a trip for a passenger that involves both street travel and rail travel. During a first segment of the trip, a first modular street vehicle 202a formed from a particular pod-base pair is assigned to transport the passenger 214 from a pickup location 220a to a drop-off location 220c at exchange station 206. At the exchange station 206, the pod from the first modular vehicle 202a is disconnected from the base unit and is re-connected to the elevated rail network 218 for the trip's second segment. So as to minimize any delay in connecting to the elevated rail network 218, the central computing system 212 reserves a slot for the passenger's pod on the elevated rail network 218 and determines the precise time that the slot will be available for loading at the exchange station 206. The central computing system 212 then adjusts the speed or route of the first modular vehicle 202a to cause the first modular vehicle 202a to arrive at the drop-off location 220c of the exchange station 206 just in time for the passenger's pod to be transitioned from a street-level base unit to the reserved slot on the elevated rail network 218. Conversely, the central computing system 212 may also tune the speed of the elevated rail network 218 to match the arrival times of the reserved rail slot and the first modular vehicle 202a at the exchange station 206.

In some implementations, the central computing system 212 may coordinate the travel speed, route, and other parameters of trips associated with multiple different vehicles. For example, the central computing system 212 may cause two or more modular vehicles to travel in a platoon. A platoon may include a group of two or more vehicles that are driven in proximity in a defined arrangement with respect to each other, e.g., based on instructions communicated to the vehicles from the central computing system 212 and/or messages communicated among the vehicles in the platoon. In some implementations, the platoon forms a sequence of vehicles driven in a single-file line. Platoons may be formed for various reasons. In some examples, the platoon forms a train of physically connected vehicles, thereby allowing batteries in one or more of the vehicles to be charged by batteries in other ones of the vehicles in the platoon. Platooning can also reduce air resistance for all or some of the vehicles in the platoon, thereby improving power efficiencies of vehicles in the platoon and extending battery life or fuel efficiencies. In some implementations, the central computing system 212 facilitates the formation of platoons by transmitting information to vehicles that allows them to efficiently locate and connect with other vehicles in the platoon. For example, the computing system 212 may identify the first modular vehicle 202a and a second modular vehicle 202b as candidate vehicles for a new platoon based on the vehicles 202a, 202b being within a threshold distance of each other in the region 200 and further based on identification that the vehicles 202a, 202b are both traveling to or through the same location (e.g., the exchange station 206). The central computing system 212 can then adjust the traveling speed, route, or other trip parameters of at least one of the first modular vehicle 202a or the second modular vehicle 202b to cause their paths to intersect along the way to the exchange station 206. When the two vehicles 202a, 202b intersect (e.g., come in close proximity to each other), they may form a platoon and travel to the exchange station 206 together, along with none, one, or more other vehicles in the platoon.

Turning to FIGS. 3A-3D, example configurations and arrangements of platooned vehicles are shown. The configuration of a platoon generally refers to the arrangement of a set of vehicle positions with respect to each other. A vehicle position is analogous to a "slot" in the platoon. A vehicle position can be filled by a vehicle that is part of the platoon. For example, FIGS. 3A and 3B show a first platoon configuration that has four vehicle positions 302, 304, 306, and 308. In the first platoon configuration, the vehicle positions are arranged in a 4×1 single-file line, such that the vehicles that fill each position are positioned directly in front of or behind another vehicle in the platoon. In contrast, FIGS. 3C and 3D show a second platoon configuration in which the vehicle positions are arranged in a 2×2 box configuration.

References in this document to the "configuration" of a platoon generally refer to the arrangement of vehicle positions with respect to each other, rather than the particular ordering of vehicles that fill the positions. However, references to the "arrangement" of vehicles in a platoon generally refer to the particular ordering of vehicles within a given platoon configuration. For example, although the platoons 300a and 300b in FIGS. 3A and 3B each share the same first "configuration," the arrangement of vehicles in the platoons 300a and 300b are different from each other. In platoon 300a, vehicles A, B, C, and D fill vehicle positions 302, 304, 306, and 308, respectively. But in platoon 300b, vehicles A, C, D, and B fill vehicle positions 302, 304, 306, and 308, respectively. Similarly, although the platoons 300c and 300d in FIGS. 3C and 3D each share the same second "configuration," the arrangement of vehicles in the platoons 300c and 300d are different from each other. In platoon 300c, vehicles A, B, C, and D fill vehicle positions 352, 354, 356, and 358, respectively. But in platoon 300d, vehicles A, D, C, and B fill vehicle positions 352, 354, 356, and 358, respectively.

In some implementations, a control system may determine an optimal configuration for a platoon and an optimal arrangement of vehicles in the platoon. When a platoon is initially formed, the control system may select a particular configuration, from a set of multiple pre-defined configurations, based on parameters that represent current or projected conditions of vehicles in the platoon, externalities such as weather, construction, or road conditions, and estimated parameters associated with the platoon. For example, the control system may select an n×1 configuration for a platoon in order to maximize the platoon's aerodynamic benefits and minimize drag. An n×2 configuration, or other configurations, may be selected in other circumstances. The arrangement of vehicles may be selected to optimize one or more variables as well. In some implementations, the configuration and arrangement of a platoon may be static through its entire lifecycle. Thus, from the initial formation of the platoon through dissolution, the platoon may maintain the same configuration, vehicle arrangement, or both. In other implementations, the configuration and arrangement of a platoon may be dynamic. In these implementations, the configuration and arrangement of the platoon may be changed during travel, before the platoon is dissolved. As explained further below with respect to FIGS. 4-9, the controller may select to re-configure or re-arrange a platoon in order to facilitate one or more objectives such as minimizing drag, minimizing travel time, or minimizing disruption resulting from separation of vehicles from the platoon.

Vehicles in a platoon may or may not be physically connected. In implementations where the vehicles are not physically connected, they may be driven so as to maintain a pre-defined distance, or range of distances, between adjacent vehicles in the platoon. The separation between vehicles in a platoon may be less than what would normally occur between non-platooning vehicles. For example, non-platooning vehicles may, on average, maintain between 15-20 meters between each other when traveling at 55 mph. However, because of close communication and coordination between vehicles in a platoon, this distance may be reduced to approximately 5-10 meters for the same speed. Mechanical and computer-based safety systems may be equipped on platooning vehicles that allow vehicles to trail each other at reduced distances without sacrificing safety. For instance, control of vehicles in the platoon may be finely coordinated so that acceleration and braking of the vehicles occur substantially in unison. Sensor data may be shared between the vehicles in real-time so that the vehicles can react accordingly to road hazards and unexpected events. In some implementations, the distance between vehicles in the platoon may be adjusted as a function of speed and travel conditions. As the platoon travels faster, the target separation distance between adjacent vehicles in the platoon may be increased. As the platoon travels slower, the target separation distance between adjacent vehicles in the platoon may be decreased. Likewise, on straightaways with good road and environmental conditions, the target separation distance may be decreased. On curving roads, roads with frequent elevation changes, and in poor environmental conditions (e.g., wet or icy roads), the target separation distance may be increased.

In implementations where the vehicles are physically connected, the connection may be realized in various ways. In some implementations, the physical connection may be made by flexible electrical cables that carry electrical power, control signals, or both, between vehicles. An electrical cable may carry electrical power between vehicles to transfer power reserves from one vehicle to another. For example, a first vehicle in a platoon may provide charge to the batteries of a second vehicle in the platoon while the platoon is traveling. The range of the second vehicle may be extended as a result of the electrical power donated from the first vehicle. In some implementations, the electrical cable may be configured such that a user can manually couple the cable between two vehicles while the vehicles are stationary. In some implementations, the electrical cable can be extended and retracted from a vehicle, and coupled to another vehicle, during travel. For instance, a magnet on a terminal end of the electrical cable may be guided to an appropriate connection point on a vehicle due to the force from a complementary magnet installed in the vehicle housing at the connection point. A locking mechanism may then secure the cable to the second vehicle. The electrical cable may include primary cables for power transfer and secondary cables for carrying small signals, e.g., for passing communications data and control signals between computing systems on the respective vehicles. In some implementations, vehicles may be mechanically secured, e.g. via trailer hitches, to maintain the arrangement of vehicles in a platoon.

Figure 4:
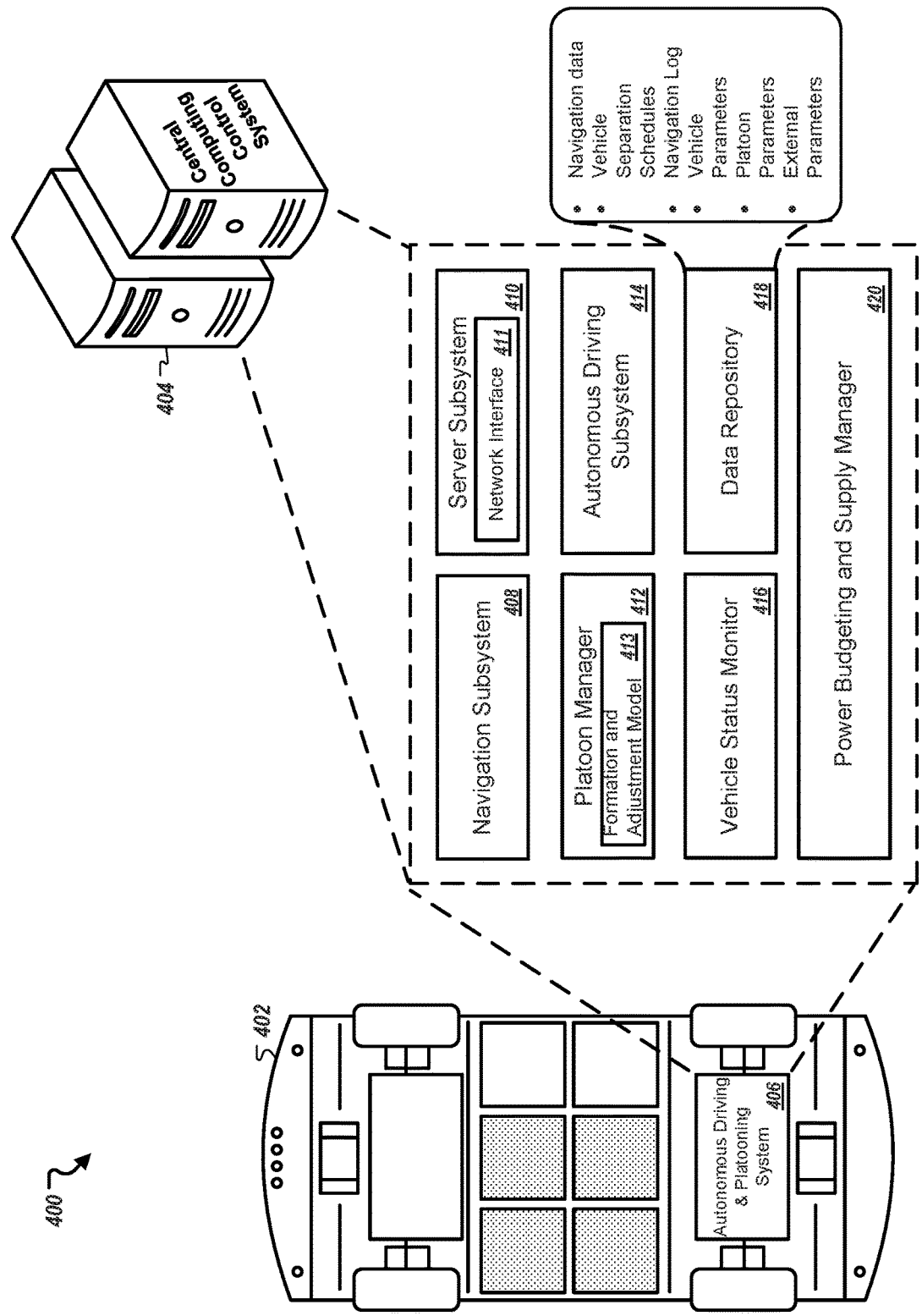
FIG. 4 depicts an example computing environment of systems that facilitate platoon formation and management.

FIG. 4 depicts an example computing environment 400 of systems that facilitate platoon formation and management. Two computing systems 404 and 406 are depicted in the environment 400. The first is an autonomous driving and platooning (ADP) computing system 406. ADP system 406 is an onboard computing system that is installed on vehicle 402. The ADP system 406 generally encompasses one or more computers on the vehicle 402 that are configured to control various aspects of the vehicle's operation. For example, the ADP system 406 may process data from vehicle sensors (e.g., camera, radar, lidar, GPS) and from central system 404 to implement autonomous driving, navigation, and platooning capabilities. Vehicle 402 may be any appropriate type vehicle that is subject to platooning according to the techniques described herein, such as a modular street vehicle, a sedan, a sport utility vehicle, a van, a pickup truck, a lorry, or the like. Vehicle 402 may have a combustion engine, an electric motor, or both, as the primary propulsion mechanism for the vehicle 402. The vehicle 402 may be an automotive street vehicle configured to travel on public roadways. In some implementations, however, other types of self-propelled vehicles, e.g., unmanned aerial vehicles (drones) or robots, may be equipped with ADP system 406 to enable the vehicle to participate in platooning.

The central control (CC) computing system 404 includes one or more computers in one or more locations that are external to the vehicle 402. The CC system 404 may be part of the central computing system 212 (FIG. 2) in some implementations. In general, the ADP system 406 on the vehicle 402 and the CC system 404 may communicate via bi-directional communication channels, such as a wideband wireless area network. The CC system 404 monitors information in real-time about vehicles and environmental conditions in one or more location areas. Based on the monitored information, the CC system 404 may manage platoons within the location areas. In some implementations, the CC system 404 may direct the formation of new platoons, determine adjustments to traveling platoons, and direct the dissolution of platoons. The CC system 404 may coordinate the actions of a platoon relative to other platoons and individual vehicles. For example, the CC system 404 may determine appropriate traveling speeds for multiple platoons so as to allow each of the platoons to travel their respective routes as efficiently as possible without interference from other platoons.

A set of components 408-420 are shown in FIG. 4 extending from both ADP system 406 and CC system 404. In general, each of the components 408-420 are computing subsystems that may be provided as part of the ADP system 406, as part of the CC system 404, or at both the ADP system 406 and CC system 404. In some implementations, particular aspects of a given component 408-420 may be divided between the ADP system 406 and CC system 404. For example, the platoon manager 412 may be provided at the CC system 404 for centrally directed platoon management, or the platoon manager 412 may be provided on the ADP systems 406 of individual vehicles for more distributed platoon management based on communications among individual vehicles. Each of the components 408-420 may be implemented on dedicated or shared hardware. The components 408-420 may each include one or more processors and may execute instructions stored on computer-readable media that are configured to carry out the operations described herein.

The navigation subsystem 408 is configured to determine travel routes for the vehicle 402. A travel route may indicate directions for the vehicle 402 to navigate to a specified destination. The destination may be specified by a driver of the vehicle 402 or may be learned, for example, based on driving patterns of the vehicle 402. The particular route for navigating to the destination may be determined by machine navigation algorithms, may be specified by the driver or other user, or both. The navigation subsystem 408 generate navigation data that represents a travel route. In some implementations, navigation data may indicate turn-by-turn directions for navigating from an origin location to a destination location. The navigation subsystem 408 may maintain travel routes that are currently being traveled by the vehicle 402 or that are planned to be traveled by the vehicle at future times. The vehicle 402 may further be equipped with a Global Positioning System (GPS) chip that outputs coordinates representing a current geographic location of the vehicle 402. The navigation subsystem 408 may use coordinates from the GPS chip to identify the vehicle's location for the purpose of determining travel routes and tracking the vehicle's progress in navigating a route.

The server subsystem 410 provides a front-end for network communications between the ADP system 406 and CC system 404. A first server subsystem 411 at the vehicle 402 may enable transmission of messages to and from CC system 404, and messages between the vehicle 402 and other vehicles. A second server subsystem 411 at the CC system 404 may enable transmission of messages to and from the vehicle 402 and other vehicles. The server subsystems 411 may include wireless network interfaces 411 that provide the requisite RF systems for transmitting and receiving data on one or more wireless channels.

In some implementations, the vehicle 402 is an autonomous vehicle that can be driven along a travel route by machine, without the guidance of a human operator. The autonomous driving subsystem 414 may process data about the vehicle 402 and its environment to determine operations for safely driving the vehicle 402 on public or private roadways. For example, the subsystem 414 may use cameras, radar, lidar, or other combinations of sensors to detect vehicles and other objects in proximity of the vehicle 402. The subsystem 414 may accelerate, steer, and brake the vehicle 402 in traffic, while avoiding collisions with the vehicles and other objects detected in proximity of the vehicle 402.

In some implementations, the ADP 406 may include a vehicle status monitoring subsystem 416 that monitors a current status of the vehicle 402 and reports information about the current status to the CC system 404 at particular times (e.g., every 0.25, 0.5, 1, 2, 5, 10, 30, or 60 seconds). Status information can also be stored in a log within data repository 418. Vehicle status information can include a current geographic location of the vehicle 402, a current traveling speed of the vehicle 402, a current travel route of the vehicle 402, an instantaneous or average rate of power consumption by the vehicle 402, a level of power reserve available to the vehicle 402, a current number of occupants in the vehicle 402, navigation data indicating a travel route currently being traveled by the vehicle 402, diagnostic data indicating operational statuses of various components of the vehicle 402, and environmental data indicating information about road or weather conditions sensed by the vehicle 402. If the vehicle 402 has a combustion engine fueled by gasoline, for example, the rate of power consumption may be in terms of a fuel efficiency, e.g., miles traveled per gallon of gasoline. The level of power reserve may be provided as an indication of a volume of gasoline remaining in the vehicle's tank. If the vehicle 402 is electrically powered, the rate of power consumption may be provided in terms of power or energy usage per minute or hour, and the level of power reserve may be provided as an indication of the amount of charge remaining in the vehicle's battery pack. The indication of the amount of charge may be a percentage of charge remaining or depleted from the battery pack, or an absolute indication of charge remaining or depleted from the battery pack.

A platoon manager 412 may be provided at the ADP system 406, CC system 404 or both. The platoon manager 412 is configured to manage operations of platoons of vehicles. These operations may include forming platoons, re-configuring existing (e.g., traveling) platoons, re-arranging vehicles in a platoon, dissolving a platoon, adding or separating vehicles from a platoon, merging multiple platoons into a single platoon, and controlling traveling parameters (e.g., traveling speed, travel route) of a platoon.

In implementations where the platoon manager 412 is provided in a central system outside of the vehicles that form the platoon (e.g., in CC system 404), the platoon manager 412 may determine the parameters for a platoon operation, generate instructions that specify the determined parameters, and provide the instructions to a front-end server 410 for transmission to one or more vehicles. The platoon manager 412 may also process vehicle status information and other information used to determine the parameters for a platoon operation.

In implementations where the platoon manager 412 is provided at least in part at the vehicle 402, e.g., in ADP 406, the platoon manager 412 may be configured to communicate with other vehicles to determine platoon operations in a decentralized manner. For instance, the ADP 406 on a first vehicle 402 may communicate directly with one or more second vehicles via a short-range, mid-range, or long-range wireless protocol. One of the communicating vehicles may propose a platoon operation to all or some of the other vehicles in a platoon (or in a proposed platoon), and the vehicles may reach a consensus as to whether and how to perform the operation. For example, a first vehicle 402 may be traveling on a roadway and may identify a set of other vehicles that are also traveling on the roadway or that are otherwise located in proximity of the first vehicle 402. The first vehicle 402 may transmit a message to the identified vehicles indicating a proposal to form a platoon. Each of the other vehicles may accept or reject the proposal from the first vehicle 402. For instance, vehicles that have overlapping travel routes with the first vehicle 402 may choose to accept the proposal, while those having divergent travel routes may choose to reject the proposal. The first vehicle and the other vehicles that accepted the proposal may then execute a procedure to form a platoon. In some implementations, communications between vehicles may be routed through one or more remote computing systems that are external to the vehicles. However, the vehicles may still carry out platoon operations in a decentralized manner.

In some implementations, the platoon manager 412 may include a formation and adjustment model 413. The model 413 may be configured to estimate outcomes that would result from one or more platoon operations given a set of input parameters that characterize current or projected conditions of vehicles in a platoon, the platoon itself, or externalities such as weather or traffic conditions. The model 413 may include logic for determining an estimated outcome based on a set of input parameters. The logic may include rules, equations, and algorithms for deriving an estimated outcome from a given set of inputs. In some implementations, the model 413 may be a machine-learned model, such as a neural network, that is trained by machine-learning techniques.

In some implementations, the model 413 may accept inputs that may be classified as a vehicle parameter, a platoon parameter, or an external parameter.

Vehicle parameters generally indicate a condition or other information about a particular vehicle such as vehicle 402. In some implementations, vehicle parameters can include vehicle status information that is reported or derived from data reported by the vehicle status monitor 416. Examples of vehicle parameters include a current location of a vehicle, a location that the vehicle is predicted or planned to be at a future time, a proximity of the vehicle to one or more other vehicles at a current or future time, a travel route of the vehicle, an aerodynamic characteristic of the vehicle, user preferences associated with the vehicle, a power requirement of the vehicle, a number of passengers in the vehicle, an energy budget, and an energy supply profile.

A travel route may indicate directions for a vehicle to navigate to a specified destination. The travel route may be one that the vehicle is currently traveling or that the vehicle plans to travel at a later time.

An aerodynamic characteristic of the vehicle may indicate the susceptibility of the vehicle to drag when traveling in one or more conditions. A vehicle may be assigned scores that represent the aerodynamic characteristic of the vehicle under different conditions. For example, a first score may indicate the vehicle's susceptibility to drag when it is positioned as the lead vehicle in a platoon and a second score may indicate the vehicle's susceptibility to drag when it is positioned behind one or more other vehicles in platoon.

User preferences may indicate constraints set by an owner, operator, or passenger of a vehicle that bear on the vehicle's ability to platoon. For example, a user may activate or deactivate a platooning capability of the vehicle. When the platooning capability is activated, the vehicle may be directed to participate in a platoon. When the platooning capability is deactivated, the vehicle may be blocked from participating in a platoon. Other user preferences may indicate more nuanced preferences for platooning, such as minimum energy savings or trip time reductions that are estimated to result from platooning the vehicle that would be required for the vehicle to be eligible for platooning.

The power requirement of a vehicle may indicate a characteristic of the power supply of a vehicle. The power supply of a vehicle with a combustion engine may be gasoline, diesel, or another fuel. The power supply of a vehicle with an electric engine may be one or more batteries. In some implementations, the power requirement of the vehicle may thus indicate a measured rate of power consumption by the vehicle, an estimate level of power required for the vehicle to travel a pre-defined distance, a level of power reserve on the vehicle, or a combination of these. In some implementations, the power requirement of the vehicle may indicate a ratio of two or more of these values. For example, the power requirement parameter may indicate a ratio of an estimated level of power required for the vehicle to travel a predetermined distance and a level of power reserve on the vehicle. This ratio may indicate whether the vehicle has sufficient power reserve to travel to a specified location, whether the vehicle will require fuel replenishment or battery charging during a trip, and if so, when the fuel replenishment or battery charging should occur.

In some implementations, the vehicle parameters may include an energy budget parameter, an energy supply profile parameter, or both. These parameters may be maintained by the power budgeting and supply manager 420 and may facilitate transactions for energy transfers among vehicles in a platoon. Vehicles that have excess power reserves (e.g., battery charge or fuel) may offer the excess reserves for sale to other vehicles in the platoon. A vehicle's energy supply profile parameter may indicate a level of power reserve that the vehicle is offering for sale and a price of the power reserve. The price of the power reserve may be specified, for example, by an owner, operator, or passenger of the vehicle, or may be automatically set based on current energy prices (e.g., the average price of a gallon of fuel in a location area of the vehicle). The energy budget indicate parameters for a vehicle to purchase power reserves from other vehicles in the platoon. The energy budget may indicate a maximum monetary amount that is permitted to be spent on power reserves (e.g., an amount of money available in an account). In some implementations, the energy budget may, additionally or alternatively, indicate other constraints related to the purchase of power reserves, such as a price cap for the purchase of power reserves, or a maximum spend permitted for a given period of time (e.g., one trip, one day, one week, one month).

Based on the power requirements of a vehicle, power budget of the vehicle, and power supply profile of other vehicles in a platoon, the power budgeting and supply manager 420 may manage the transfer of power reserves from the vehicle to one or more other vehicles in the platoon and/or the transfer of power reserves to the vehicle from one or more other vehicles in the platoon. For example, the power budgeting and supply manager 420 may determine, based on the power requirements of a vehicle, that the range of a vehicle's planned travel route to reach a specified destination is greater than the travel range that is possible given the current charge state of a vehicle's battery pack. In response, the manager 420 may identify the energy supply profiles of other vehicles in the platoon and select one or more vehicles based on the energy supply profiles to purchase power reserves (e.g., battery charge) from. The selected vehicles may be determined, for example, based on the respective quantities of power being offered for sale by the other vehicles, the respective prices of power being offered for sale by the other vehicles, the position of the other vehicles in the platoon relative to the purchasing vehicle's position in the platoon, or a combination of these. For instance, the manager 420 may determine whether a first vehicle can purchase power from a second vehicle that is positioned adjacent to the first vehicle in the platoon. If so (e.g., if the second vehicle offers power reserves for a sale at a price acceptable to the first vehicle), then the first and second vehicles can use a physical link between them to transfer a determined amount of power reserves from the second vehicle to the first vehicle. The manager 420 may automatically apply a credit to an account of a user associated with the second vehicle for the cost of the transferred power reserve, and may automatically apply a debit to an account of a user associated with the first vehicle for the cost of the transferred power reserve. In some implementations, the platoon manager 412 may direct a re-arrangement of a platoon by instructing one or more vehicles to move into different positions of the platoon so as to facilitate the physical inter-vehicle connections that may be required to transfer power between particular vehicles during travel.

Platoon parameters generally indicate a condition or other information about a collection of vehicles as a platoon. Examples of platoon parameters include a total number of vehicles in a platoon, a number of re-configurations of the platoon, a number of re-arrangements of the platoon, scheduled times of arrival of the platoon at one or more locations, rates of power consumption of particular vehicles or groups of vehicles in the platoon, a traveling speed of the platoon, and schedule separation times for one or more vehicles in the platoon. In some implementations, the platoon parameters can indicate constraints or targets for one or more platoon operations. For example, a set of platoon parameters provided as input to the formation and adjustment model 413 may indicate minimum values, maximum values, or an acceptable range of values for different ones of the parameters (e.g., minimum number of vehicles in platoon, maximum number of vehicles in platoon, a range of an acceptable number of vehicles in platoon, an exact number of vehicles to select for the platoon). In some implementations, the platoon parameters may represent the current condition of a platoon, such as the number of vehicles currently in the platoon or the current or average traveling speed of the platoon.

External parameters generally indicate a condition or other information about an environment in which a particular vehicle or a platoon of vehicles is driven. Examples of external parameters include current or projected traffic conditions for roads in a travel route, current or projected weather conditions, current or projected road conditions, and regulatory restrictions. For example, the platoon manager 412 may determine a configuration and target traveling speed for a platoon based in part on road conditions, traffic conditions, or both, of roads along a route that a platoon is assigned to travel. For instance, if the roads are slick, the platoon may be directed to adopt a slower traveling speed than what may otherwise be adopted in dry conditions. In some implementations, platoon operations may be affected by applicable regulatory restrictions in one or more location areas that a platoon is traveling or plans to travel. Regulatory restrictions may be imposed and enforced, for example, by state or local governments based on public interest concerns. Example regulatory restrictions include speed limits, temporal restrictions that indicate acceptable and non-acceptable times for platooning (e.g., times of day, days of week), platoon restrictions that indicate bounds on one or more vehicle or platoon parameters (e.g., maximum number of vehicles that are permitted to form a platoon, maximum number of platoons acceptable within a location area at a given time, maximum weight of individual vehicles in a platoon, maximum collective weight of vehicles in a platoon, and types of vehicles that are permitted to form a platoon). The platoon manager 412 may identify any applicable regulatory restrictions for a platoon and configure the platoon to ensure compliance with the regulatory restrictions.

The ADP system 406, CC system 404, or both, may further include a data repository 418. The data repository 418 includes memory for storing data recorded by the ADP system 406, CC system 404, or both, and is generally accessible by other computing subsystems of the ADP system 406, CC system 404, or both, for read and write operations. The data repository 418 may include one or more databases and may store information representing navigation data, vehicle separation schedules, navigation logs, vehicle parameters, platoon parameters, external parameters, or a combination of these.

Figure 5:
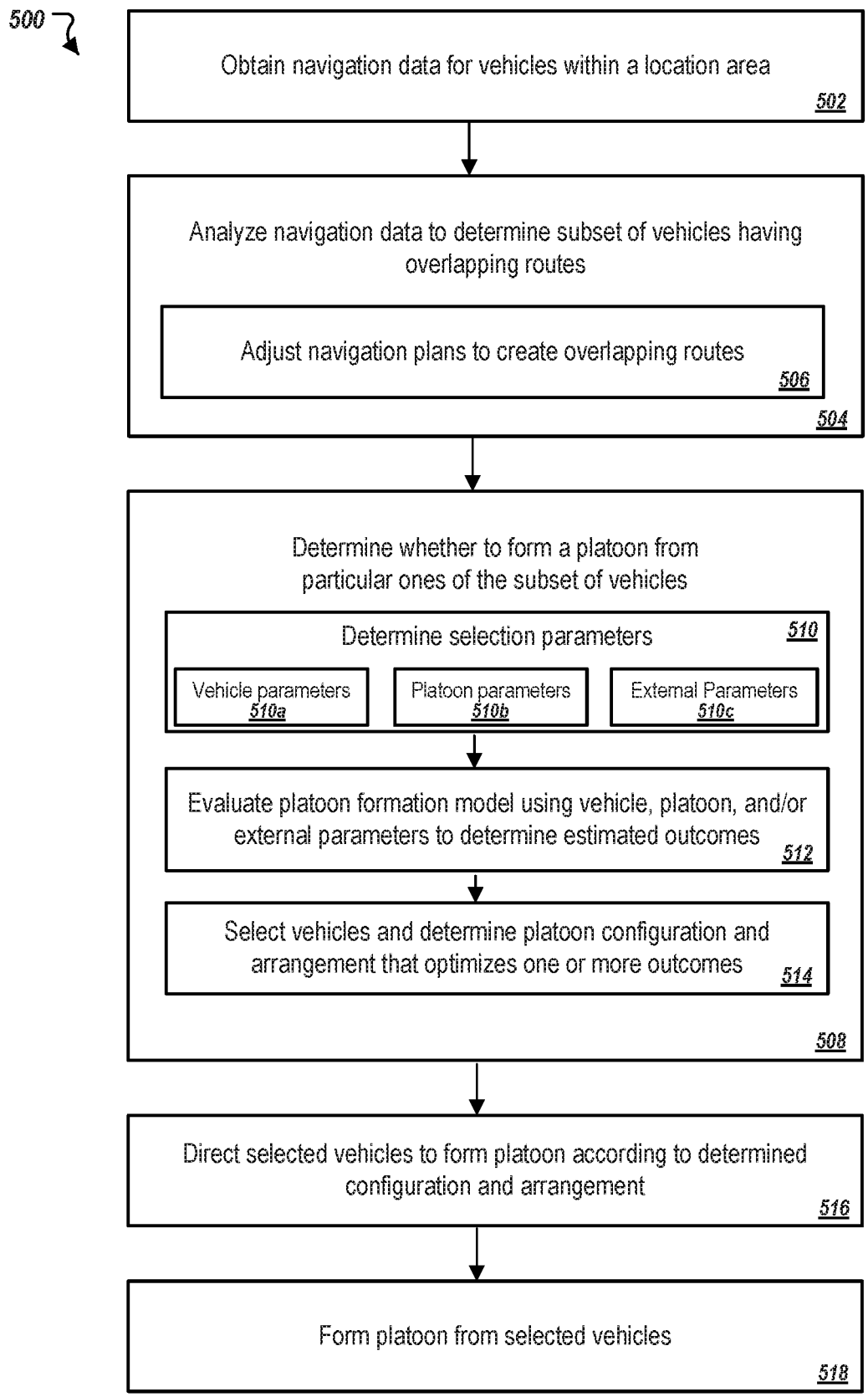
FIG. 5 is a flowchart of an example process for determining a formation of a new platoon.

Turning to FIG. 5, a flowchart is depicted of an example process 500 for determining a formation of a new platoon. The process 500 may be carried out, for example, by the ADP system 406, CC system 404, or both (FIG. 4). Forming a platoon generally refers to bringing together a group of vehicles to travel in a coordinated manner as a platoon. The process 500 provides example for determining whether to form a platoon, and for a new platoon, determining the composition, configuration, and arrangement of the platoon.

At stage 502, the navigation subsystem 408 obtains navigation data for a set of registered vehicles. The registered vehicles may have represented themselves as being capable of platooning. In some implementations, the navigation data is identified for all registered vehicles that are currently located within a location area, or that are planned to be located within the location area during a particular time interval. A location area may be, for example, a geographic region with a defined size such that vehicles across the location area can come together to form a platoon within a reasonable time (e.g., 1, 2, 5, or 10 minutes). A location area may include particular roads or stretches of roads, and exclude other roads or stretches of roads within a geographic region. The navigation data obtained for the vehicles may indicate travel routes for the vehicles, and may include times that the vehicles will be traveling the routes. The navigation data may further indicate times that the vehicles will be located at particular locations along their respective travel routes.

At stage 504, the navigation subsystem 408 analyzes the navigation data and determines a subset of the registered vehicles that have overlapping routes during the same or nearby time intervals. For example, the navigation subsystem 408 may identify that Vehicles A, B, C, and D all plan to travel west on the same portion of Interstate 80 on or around 4:50 PM. Vehicles A, B, C, and D may therefore be identified as having at least partially overlapping routes. The subset of vehicles identified at stage 504 need not have completely overlapping routes. In some implementations, it may sufficient that the identified vehicles have overlapping routes for at least a threshold distance or a threshold travel time (e.g., 2 miles or 5 minutes of travel time during overlapping portions of the routes of the vehicles).

In some implementations, the navigation subsystem 506 may modify initial travel routes for one or more vehicles to create overlapping travel routes. For example, if a vehicle initially planned to travel on city streets, but could alternatively travel to a specified destination on a highway so as to overlap with the travel routes of other vehicles, the initial travel route may be modified accordingly, for the purpose of determining whether the vehicle should be included in a platoon. In some implementations, if the vehicle is not selected to participate in a platoon, the modified travel route may be reverted to the initial travel route so as not to alter the vehicle's initial travel plans.

At stage 508, the platoon manager 512 determines whether to form a platoon from two or more of the identified vehicles that have overlapping travel routes. In some implementations, the platoon manager 512 estimates one or more outcomes that would result from forming a platoon and compares the estimated platoon outcomes to outcomes that would result if a platoon were not formed. If the estimated platoon outcomes improve non-platoon outcomes by at least a threshold amount, then the platoon manager 512 may select to form a platoon. If the estimated platoon outcome does not improve the non-platoon outcomes by at least the threshold amount, then the platoon manager 512 may select to not form a platoon. The threshold may be negative, neutral, or positive. In some implementations, outcomes may be scored to quantify the outcomes and to quantify differences between platooning and non-platooning outcomes.

In some implementations, the outcomes may relate to one or more vehicle parameters for the vehicles that are proposed to form a platoon. Example outcomes include trip times for one or more vehicles and power consumption by one or more vehicles. Trip times may relate to the total trip time for a vehicle to travel a route from an origin location to a destination location, or may relate to the time required to travel only a portion of the entire route (e.g., from a midpoint of the route to the destination). Outcomes may be evaluated for individual vehicles or for groups of vehicles. For instance, the platoon manager 512 may determine the respective trip times for each of Vehicles A, B, C, and D if the vehicles traveled independently, and not in a platoon formation. The platoon manager 512 may also compute the respective trip times for each of Vehicles A, B, C, and D if the vehicles traveled in the platoon formation, rather than independently. The trip times for independent travel may be compared to the estimated trip times for platoon travel. If the platoon manager 512 determines that the independent travel times are better than the platoon travel times, then the manager 512 may select not to direct Vehicles A, B, C, and D to form a platoon. If the platoon manager 512 determines that the estimated platoon travel times reduce the travel times relative to independent travel by at least a threshold amount, then the manager 512 may select not to direct Vehicles A, B, C, and D to form the platoon. In some implementations, the combined travel times from all the vehicles may be compared. In some implementations, the travel times may be combined according to a function that weights travel times for some vehicles more significantly than others.

Recall that at stage 504, a subset of vehicles were identified that have at least partially overlapping routes during a given time interval. In some instances, different outcomes may be achieved if different combinations of these vehicles formed a platoon. For example, trip times and power consumption may be improved by forming a platoon with Vehicles A, B, C, but excluding D from the platoon. On the other hand, if all of Vehicles A, B, C, and D were included in the platoon, trip times and power consumption may be determined to improve by a lesser amount, or not improved at all. Accordingly, the platoon manager 512 may direct a platoon to be formed by the most optimal composition of vehicles (e.g., Vehicles A, B, and C only) rather than all the identified vehicles in the subset having overlapping routes. In some implementations, the platoon manager 512 determines outcomes for many permutations of platoons and selects to form one or more platoons having the best outcomes, so long as the outcomes satisfy the threshold improvement relative to independent travel. The candidate platoon permutations may include different compositions of selected vehicles, configurations, and arrangements, or combinations of these.

In some implementations, the platoon manager 512 may determine estimated outcomes for forming a platoon by evaluating formation and adjustment model 412. As discussed further with respect to FIGS. 6-9, the model 412 may also estimate outcomes for other platoon operations such as dissolving a platoon, re-configuring a platoon, re-arranging a platoon, merging platoons, adding vehicles to a platoon, or separating vehicles from a platoon.

In general, to evaluate the outcomes of a proposed platoon, the platoon manager 512 selects a set of proposed platoon parameters that define particular aspects of the proposed platoon. These parameters may include, for example, the vehicle composition, configuration, and arrangement of the platoon. If estimated outcomes are being determined for multiple candidates, the platoon manager 512 may permute these proposed parameters to define the varying aspects of each candidate platoon. The proposed platoon parameters may then be provided as input to the model 412 and the model 412 generates an indication of one or more estimated outcomes that would result in a platoon formed according to the proposed platoon parameters. In some implementations, the model 412 may generate data that indicates, for each of a set of multiple possible outcomes, a likelihood that the respective outcome would occur given the set of input parameters. For example, the model 412 may output probability data representing a likelihood that a particular proposed platoon would have combined or average trip times of 10-15 minutes, 15-20 minutes, or greater than 20 minutes. The platoon manager 512 may then, for example, compare the estimated platoon travel trip time that has the highest probability to the estimated independent travel trip time that has the highest probability.

In some implementations, the model 412 may take into account additional information beyond the proposed platoon parameters when determining estimated outcomes. Thus, one or more vehicle parameters, additional platoon parameters, external parameters, or a combination of these, may also be provided as inputs to the model 412 or used to calibrate the model 412. For example, the model 412 may consider proposed trip times in view of the proposed travel routes of vehicles in a proposed platoon. Similarly, the model 412 may consider weather conditions, vehicle types, aerodynamic characteristics, and other parameters when determining proposed outcomes. These additional parameters may also provide constraints to the range of outcomes that are possible for a proposed platoon, and/or constraints to the range of proposed platoons that may be formed. For example, the manager 512 may identify a regulatory restriction that caps the maximum size of a platoon in a location area to 3 vehicles. Accordingly, the platoon manager 512 may rule out selection of a candidate platoon formation that includes more than 3 vehicles, since it would violate the regulatory restriction. In another example, if the outcome that the model 412 is configured to determine is rate of power consumption, the model 412 may account for vehicle parameters and external parameters that bear on power consumption rates (e.g., vehicle type, travel route, target traveling speeds, vehicle loads).

Stages 510-514 of FIG. 5 indicate one example of using a model 412 to determine platoon parameters that are estimated to optimize one or more specified outcomes. At stage 510, the platoon manager 512 determines a set of selection parameters for selecting particular vehicles for a proposed platoon. The selection parameters can include vehicle parameters 510, platoon parameters 510*b*, external parameters 510*c*, or parameters from two or more of these categories. These parameters, including indications of the proposed platoon composition, arrangement, and configuration, are processed by the model 412 and the model 412 determines estimated outcomes (stage 512). Based on the estimated outcomes for each of multiple proposed platoons, the platoon manager 412 may then select a particular set of parameters (e.g., vehicle composition, configuration, and arrangement) for the proposed platoon that yields the most optimal estimated outcome.

At stage 516, the platoon manager 512 identifies which vehicles from the subset identified at stage 504 are included in the optimal proposed platoon. The platoon manager 512 then generates instructions directing these vehicles to form a platoon according to the configuration and arrangement of the optimal proposed platoon. At stage 518, the selected vehicles respond to the instructions and form a platoon.

Figure 6:
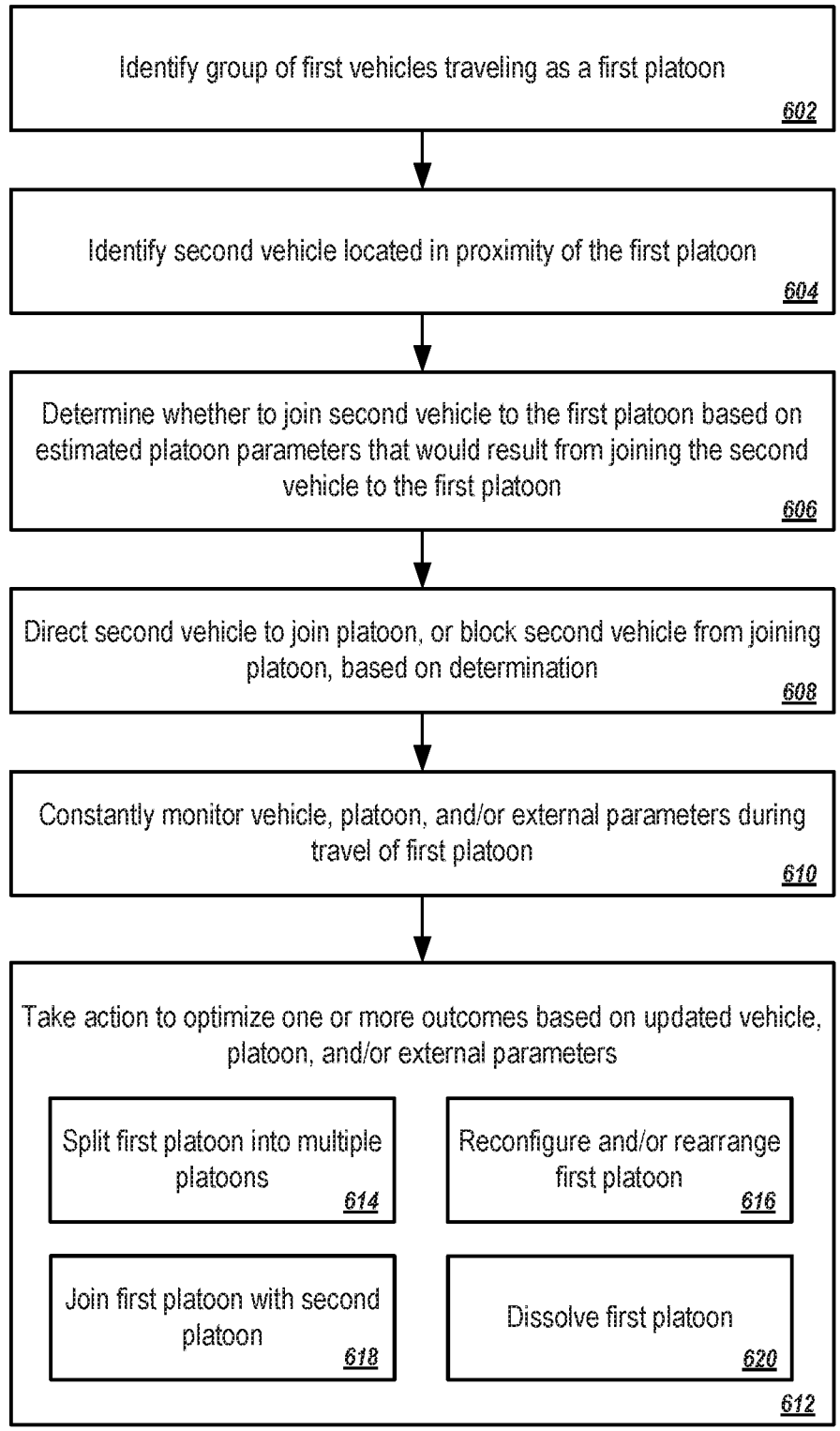
FIG. 6 is a flowchart of an example process for joining a vehicle to an existing platoon and performing other adjustments to the platoon during travel.

FIG. 6 depicts a flowchart of an example process 600 for joining a vehicle to an existing platoon and performing other adjustments to the platoon during travel. The process 600 may be carried out, for example, by the ADP system 406, CC system 404, or both (FIG. 4).

At stage 602, a group of first vehicles is identified that are currently traveling in a coordinated manner as a first platoon. The first platoon may have been formed previously, for example, based on the process 500 of FIG. 5.

At stage 604, a second vehicle is identified as a candidate for joining the first platoon. The second vehicle may be identified in various manners. In some implementations, an ADP system 406 on the second vehicle may generate a request that is sent to the CC system 404 or directly to other vehicles in proximity of the second vehicle, where the request indicates that the second vehicle is seeking to join a platoon. The request may be a general request to join any appropriate platoon or may be a specific request to join the first platoon. In response, computing systems of the first vehicles in the first platoon, or the CC system 404, may queue the request (e.g., join requests may be processed from multiple vehicles in the order received) or the request may be processed immediately. In some implementations, computing systems of the first vehicles in the first platoon, or the CC system 404, may actively search for candidate vehicles to join the first platoon and the second vehicle may be identified without broadcasting a request to join the first platoon. For example, the CC system 404 may look for ways to optimize one or more outcomes of the first platoon, and may evaluate whether joining additional candidates to the first platoon would improve such outcomes.

At stage 606, a platoon manager 412 at either the ADP systems 406 of vehicles in the first platoon, or the CC 406, determines whether to join the second vehicle to the first platoon. In some implementations, this determination is made based on one or more outcomes that are projected to result from joining the second vehicle to the first platoon. For example, the platoon manager 412 may estimate the impact on trip times or power consumption for one or more vehicles in the first platoon, for the second vehicle, or both, that would result from joining the second vehicle. In some implementations, if one or more specified outcomes improve (or do not degrade) by at least a threshold amount, then the platoon manager 412 may select to join the second vehicle to the first platoon. The threshold may be positive, neutral, or negative. The outcomes may be determined using the formation and adjustment model 413.

In some implementations, the evaluated outcomes may include platoon parameters. The platoon manager 412 may determine whether to join the second vehicle to the first platoon based on estimated platoon parameters that would result from joining the second vehicle to the first platoon. The estimated platoon parameters may be compared to acceptable platoon parameters. If values of the estimated parameters are among the values of acceptable parameters, then the second vehicle may be directed to join the first platoon. If values of the estimated parameters are not among the values of acceptable parameters, then the second vehicle may be directed not to join the first platoon. The platoon parameters may include a number of vehicles in the platoon, a number of permissible re-configurations of the platoon, a number of permissible re-arrangements of the platoon, scheduled times of arrival of the platoon at one or more locations, a level of power consumption of one or more vehicles in the platoon, a traveling speed of the platoon, scheduled separation times for one or more vehicles from the platoon, or a combination of these. For instance, if the number of vehicles in the platoon that would result from joining the second vehicle would exceed a cap on the number of vehicles allowed to be in the first platoon, a request to join the second vehicle to the first platoon may be denied.

At stage 608, if the platoon manager 412 has determined to join the second vehicle to the first platoon, the second vehicle is directed either to join the first platoon or not to join the first platoon, as appropriate. If the platoon manager 412 has determined not to join the second vehicle to the first platoon, the second vehicle may not be instructed to join the first platoon.

In some implementations, the statuses of a platoon, and vehicles within a platoon, may be constantly monitored (stage 610). The platoon manager 412 may periodically evaluate whether adjustments may be made to the platoon to improve one or more outcomes. If estimated outcomes from an adjusted platoon are determined to improve relative to outcomes from the current state of the platoon by at least a threshold amount, then the platoon manager 412 may direct that a proposed adjustment be carried out. In some implementations, each time an updated set of vehicle parameters, platoon parameters, and/or external parameters becomes available, the platoon manager 412 may evaluate a set of proposed adjustments in light of the updated parameters, e.g., using model 413. Outcomes from the proposed adjustments may then be compared to projected outcomes that would result from the current state of the platoon.

At stage 612, the platoon manager 412 directs performance of a proposed platoon operation corresponding to an adjustment that has been determined to provide acceptable outcomes. The platoon operation may include splitting the first platoon into two or more platoons (614), reconfiguring the first platoon (e.g., transitioning from a 3×2 platoon to a 6×1 platoon) (616), re-arranging the first platoon (e.g., moving vehicles in the platoon to different positions) (616), joining or merging the first platoon with one or more other platoons (618), or a combination of these. In some implementations, the platoon manager 412 may direct the first platoon to be dissolved prematurely (620) if, for example, the model 413 indicates that individual travel for vehicles in the first platoon would likely produce better outcomes than if the vehicles were to continue traveling together in a platoon formation.

Figure 7:
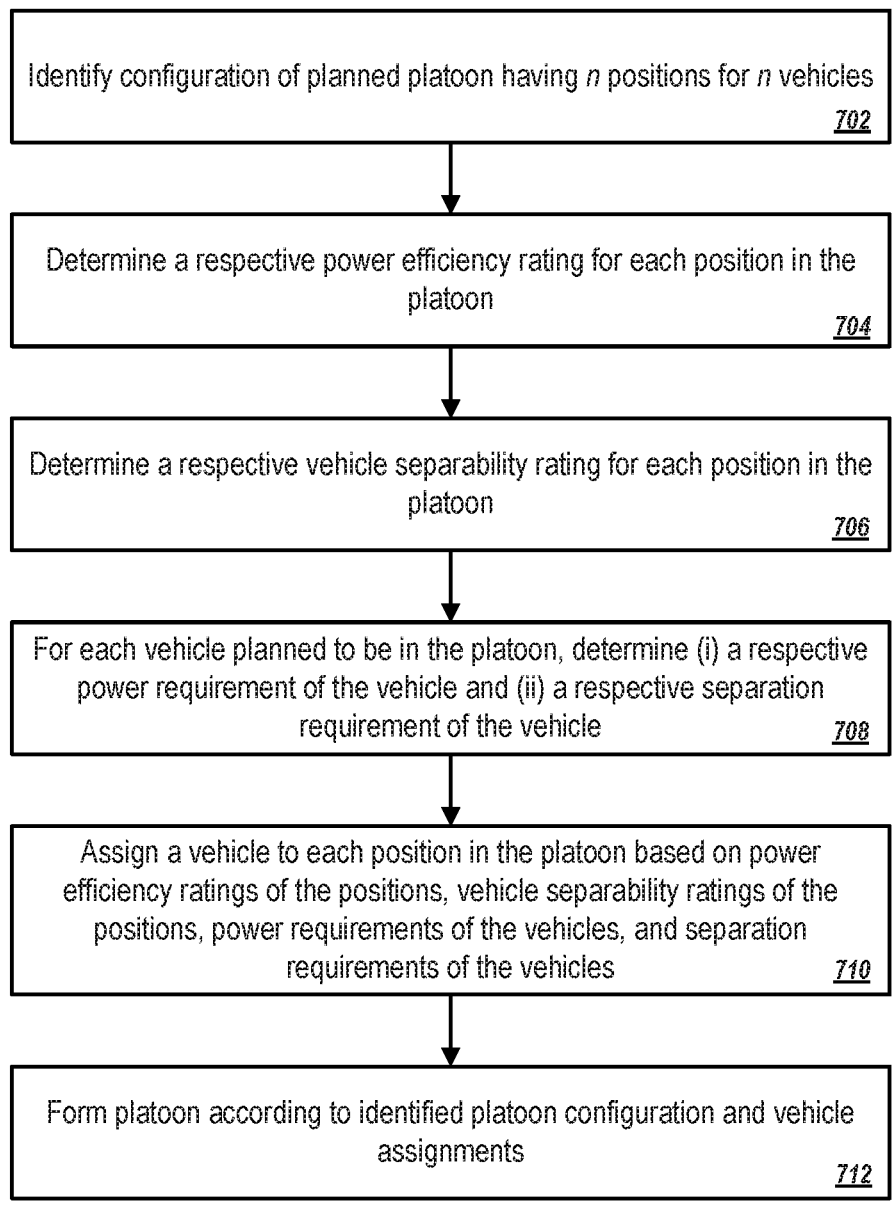
FIG. 7 is a flowchart of an example process for determining an arrangement of vehicles in a platoon.

FIG. 7 depicts a flowchart of an example process 700 for determining an arrangement of vehicles in a platoon. The process 700 may be carried out, for example, by the ADP system 406, CC system 404, or both (FIG. 4). In some implementations, the determined arrangement may be an initial arrangement for a new platoon. In some implementations, the determined arrangement may be a re-arrangement for an existing platoon.

At stage 702, the platoon manager 412 identifies a configuration of the platoon for which the arrangement of vehicles is to apply. The identified configuration may represent a set of n vehicle positions that are arranged relative to each other in a pre-defined manner.

At stage 704, the platoon manager 412 determines a respective power efficiency rating for each vehicle position in the identified configuration. The power efficiency rating for a particular vehicle position may indicate the relative power burden that a vehicle would experience by being assigned to the particular position in the platoon. In some implementations, the power efficiency rating may be based on the relative drag that would be experienced by a vehicle in a particular vehicle position. For example, a vehicle that is located in the lead position of a platoon will likely encounter more air resistance than vehicles that are located behind the lead. Accordingly, the lead position of a platoon may be assigned a lower power efficiency rating than other positions to reflect the extra power that may be required for a vehicle in the lead position to overcome relatively higher drag.

At stage 706, the platoon manager 412 determines a respective vehicle separability rating for each vehicle position in the identified configuration of the platoon. The vehicle separability rating for a particular vehicle position may indicate how readily a vehicle located in the particular vehicle position can separate from the platoon. For instance, a vehicle in the last (nth) position of an n×1 configured platoon may have a high separability rating that reflects the relative ease by which the vehicle can separate from the platoon without disruption to other vehicles. When the vehicle in the back most position of this platoon separates, no additional vehicles in the platoon may need to be disconnected and reconnected to make up for the loss of the departed vehicle. In contrast, vehicles in the center of a large platoon (e.g., 4×3 platoon) may have lower separability ratings that reflect the relative difficulty of separating those vehicles, which may be encircled by other vehicles that would need to clear space for the center vehicles to separate.

At stage 708, the platoon manager 412 determines, for each vehicle in the platoon, (i) a respective power requirement of the vehicle, (ii) a respective separation requirement of the vehicle, or both. The power requirement of a vehicle may indicate a characteristic of the power supply of a vehicle. The power supply of a vehicle with a combustion engine may be gasoline, diesel, or another fuel. The power supply of a vehicle with an electric engine may be one or more batteries. In some implementations, the power requirement of the vehicle may thus indicate a measured rate of power consumption by the vehicle, an estimated level of power required for the vehicle to travel a pre-defined distance, a level of power reserve on the vehicle, or a combination of these. In some implementations, the power requirement of the vehicle may indicate a ratio of two or more of these values. For example, the power requirement parameter may indicate a ratio of an estimated level of power required for the vehicle to travel a predetermined distance and a level of power reserve on the vehicle.

The separation requirement of a vehicle may indicate information about the vehicle's plans to separate from the platoon. As a platoon travels, vehicles may separate from the platoon at different times and locations. For example, a platoon may travel for 30 miles on an interstate. A first vehicle may separate from the platoon after 10 miles in order to reach its destination, a second vehicle may separate from the platoon after another 5 miles in order to reach its destination, and the remaining vehicles may continue in the platoon until the end of the 30 miles, at which time the platoon is dissolved and the vehicles each take their own routes to respective destinations. The separation requirement of a vehicle may thus indicate a location, a time, or both, that a vehicle plans to separate from the platoon. The separation requirement may be determined, in some implementations, from a vehicle separation schedule that may indicate the respective separation requirements for each vehicle in a platoon.

At stage 710, the platoon manager 412 determines an arrangement of vehicles in the platoon by assigning a respective vehicle to each of the vehicle positions in the identified platoon configuration. In some implementations, the arrangement may be determined based on the power efficiency ratings of the vehicle positions, the vehicle separability ratings of the vehicle positions, the power requirements of the vehicles, the separation requirements of the vehicles, or a combination of two or more of these. For example, for a shorter trip, the platoon manager 412 may place the first vehicle that plans to separate from the platoon in the back most position of the platoon with the highest separability rating, so as to minimize disruption to the platoon when that vehicle separates. However, if it will be a long time before the first separation occurs, the vehicle that will first separate may be placed at a position with a lower separability rating initially if the power requirement of the vehicle better aligns with the power efficiency rating of the assigned vehicle position. As the platoon approaches the location where the vehicle will eventually separate, the vehicle may later move to a position that has a higher separability rating in anticipation of the separation.

At stage 712, the platoon manager 412 directs the vehicles in the platoon to arrange according to the arrangement determined at stage 710. Upon receiving the direction from the platoon manager 412, the vehicles may respond by forming a platoon according to the determined arrangement.

Figure 8:
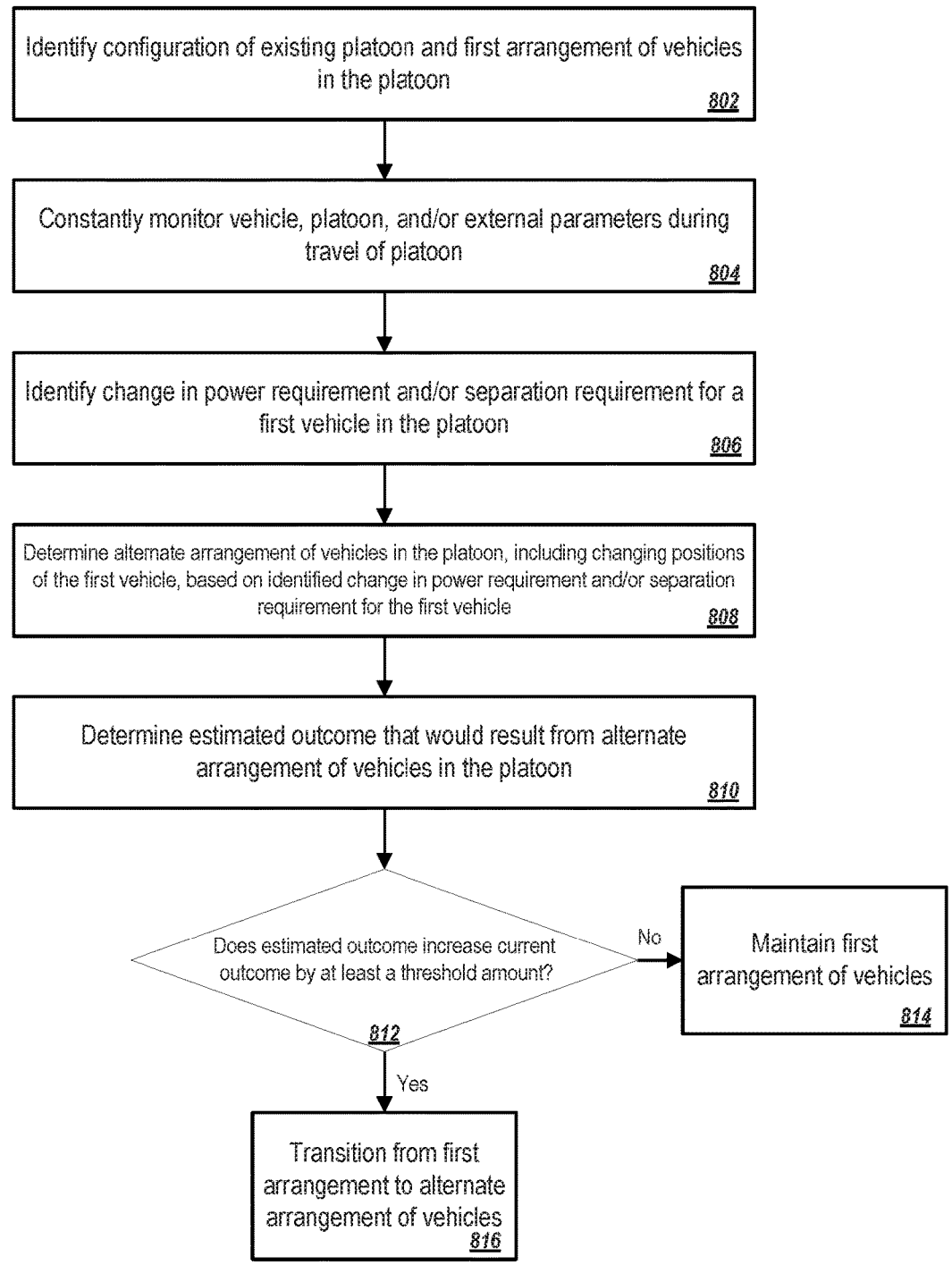
FIG. 8 is a flowchart of an example process for determining whether to re-arrange vehicles in an existing platoon.

FIG. 8 depicts a flowchart of an example process 800 for determining whether to re-arrange vehicles in an existing platoon. The process 800 may be carried out, for example, by the ADP system 406, CC system 404, or both (FIG. 4).

At stage 802, the configuration of a particular platoon is identified along with a current arrangement of vehicles in the platoon. In some implementations, the platoon is currently traveling. At stage 804, various parameters that may bear on the optimal arrangement of the platoon are monitored. For instance, as the platoon travels, the platoon manager 412 may identify updated vehicle parameters, platoon parameters, external parameters, or a combination of these. At stage 806, the platoon manager 412 is alerted to a change in either or both of a power requirement of a first vehicle in the platoon or a separation requirement of the first vehicle. For example, the fuel efficiency of the first vehicle may be lower than a projected fuel efficiency, or a passenger of the first vehicle may have altered the first vehicle's travel route to cause the first vehicle to separate from the platoon at an earlier time than initially planned.

At stage 808, in response to identifying a change in one or both of the power requirement of the first vehicle and the separation requirement of the first vehicle, the platoon manager 412 determines a candidate re-arrangement of the vehicles in the first platoon that may better suit the updated requirements of the first vehicle. For example, if the first vehicle plans to separate sooner, then the candidate re-arrangement may indicate a proposal to move the first vehicle to a position in the platoon that has a higher separability rating.

At stage 810, the platoon manager 412 determines an estimated outcome that would result from re-arranging the vehicles in the platoon according to the candidate re-arrangement. In some implementations, the formation and adjustment model 413 may generate the estimated outcome based on the updated vehicle, platoon, and external parameters. At stage 812, the platoon manager 412 determines whether the estimated outcome that would result from the candidate re-arrangement is preferable to an outcome that is projected to result from the current arrangement of vehicles. For instance, the estimated trip times or power consumption of one or more vehicles in the platoon may be compared between the initial arrangement and candidate re-arrangement. If the trip times or power consumption of the vehicles is decreased by at least a threshold amount, remains the same, or does not increase by more than a threshold amount, then the candidate arrangement may be deemed preferable to the initial arrangement. Therefore, at stage 816, the platoon may be directed to transition from the first arrangement to the candidate arrangement. If the estimated trip times or power consumption outcomes, or other outcomes, do not meet the threshold, then the first arrangement of vehicles in the platoon may be maintained.

FIG. 9 depicts a flowchart of an example process 900 for directing separation of a vehicle from a platoon. The process 900 may be carried out, for example, by the ADP system 406, CC system 404, or both (FIG. 4).

At stage 902, a configuration of a traveling platoon is identified, along with an arrangement of vehicles in the platoon. At stage 904, a platoon manger 412 identifies a first vehicle in the platoon that is current located in a first position of the platoon. The first position of the platoon may have a low separability rating. At stage 906, the platoon manager 412 determines that the platoon is within a threshold distance of a planned separation location for the first vehicle. For example, the first vehicle may plan to exit a highway at a particular exit ramp and thus needs to separate from the platoon by the time the platoon reaches the exit ramp. The location of the exit ramp may thus be a planned separation location. The platoon manager 412 may monitor a current location of the platoon and may be alerted when the current location is within a threshold travel distance (e.g., 0.5, 1, 2, or 5 miles) of the planned separation location. At stage 908, in response to detecting that the platoon's current location is within the threshold travel distance of the planned separation location, the platoon manager 412 may direct the first vehicle to move from the first position of the platoon to a different, second position that has a higher separability rating. In the second position, the first vehicle may be better positioned to separate from the platoon. At stage 910, the platoon manager 412 detects that the platoon is at or near the planned separation location, and in response, the first vehicle separate from the platoon at the planned separation location.

Figure 10:
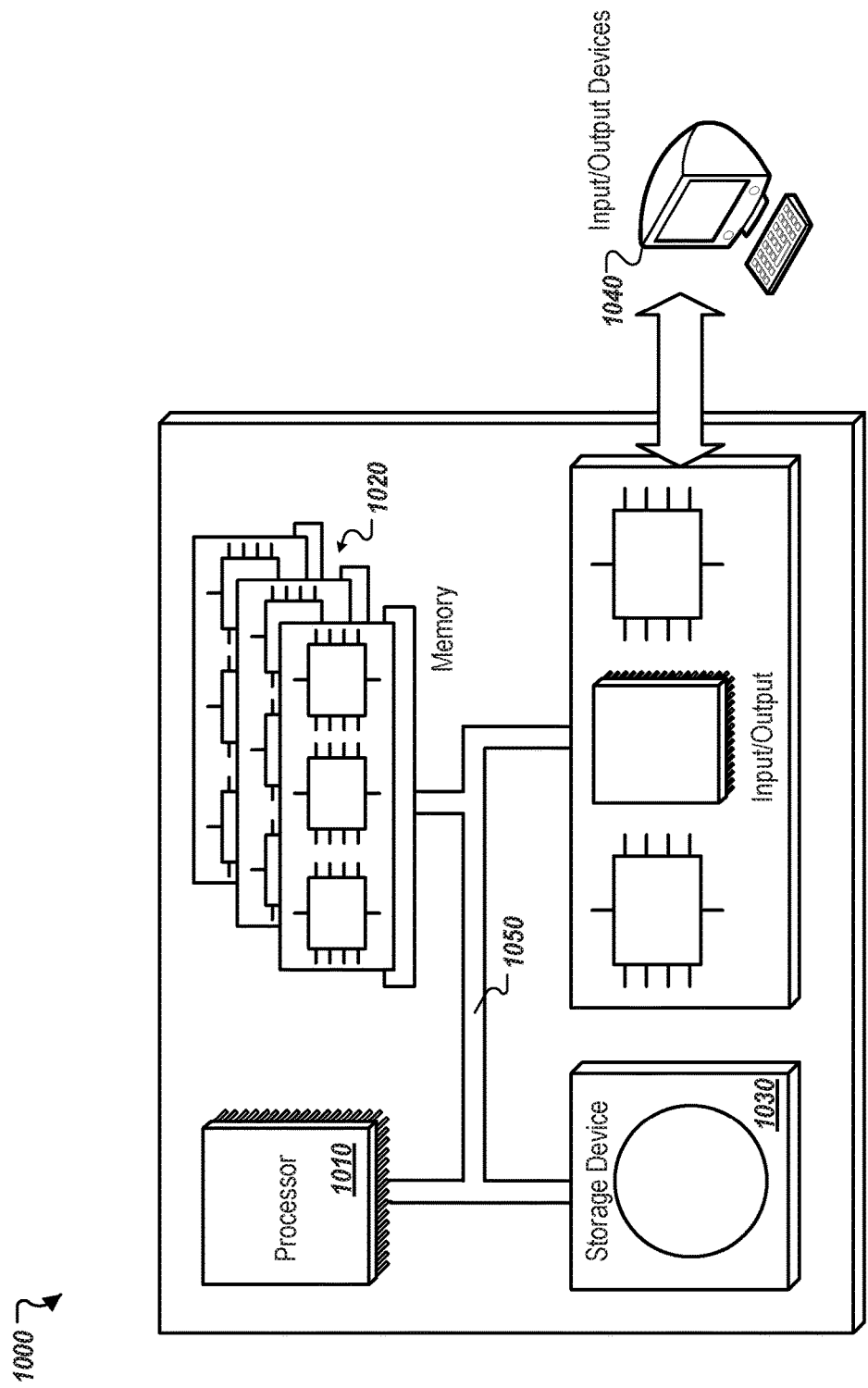
FIG. 10 depicts a schematic diagram of a computer system that may be applied to any of the computer-implemented methods and other techniques described herein.

FIG. 10 is a schematic diagram of a computer system 1000. The system 1000 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 1000) and their structural equivalents, or in combinations of one or more of them. The system 1000 is intended to include various forms of digital computers, such as laptops, desktops, workstations, personal digital assistants, servers, blade servers, mainframes, and other appropriate computers, including vehicles installed on base units or pod units of modular vehicles. The system 1000 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. The processor may be designed using any of a number of architectures. For example, the processor 1010 may be a CISC (Complex Instruction Set Computers) processor, a RISC (Reduced Instruction Set Computer) processor, or a MISC (Minimal Instruction Set Computer) processor.

In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 400. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 400. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    instructing a first vehicle traveling on a roadway to form a platoon with a second vehicle traveling on the roadway;
    obtaining, by a computing system, information about a travel route planned for the first vehicle;
    determining, by the computing system and based on the information about the travel route planned for the first vehicle, a predicted outcome of the first vehicle's travel along at least a portion of the travel route, wherein the predicted outcome relates to an amount of power consumed by the first vehicle;
    determining, by the computing system and based on the predicted outcome of the first vehicle's travel along at least a portion of the travel route, a set of travel parameters for the platoon that prescribe travel characteristics for vehicles in the platoon; and
    directing, by the computing system, the first and second vehicles to travel in the platoon according to the set of travel parameters.

2. The method of claim 1, wherein determining the predicted outcome of the first vehicle's travel along at least a portion of the travel route comprises determining a rate of power consumption of the first vehicle.

3. The method of claim 2, further comprising determining, by the computing system, whether to form the platoon or change a configuration of the platoon based on the rate of power consumption of the first vehicle.

4. The method of claim 1, wherein the first vehicle and the second vehicle are cargo vehicles.

5. The method of claim 1, wherein the first vehicle is a lorry or a flatbed trailer-truck.

6. The method of claim 1, wherein directing, by the computing system, the first and second vehicles to travel in the platoon according to the set of travel parameters comprises transmitting instructions specifying travel parameters to the first and second vehicles over a wireless channel.

7. The method of claim 1, wherein directing, by the computing system, the first and second vehicles to travel in the platoon according to the set of travel parameters comprises sending instructions to the first and second vehicles to form the platoon or change a configuration of the platoon.

8. The method of claim 1, wherein the first and second vehicles are configured, while traveling in the platoon, to maintain a target separation distance between the vehicles and to coordinate at least one of acceleration and braking of the vehicles.

9. The method of claim 1, wherein the first and second vehicles are configured, while traveling in the platoon, to exchange sensor data detected by respective sensors on the vehicles with the other vehicle.

10. The method of claim 1, wherein the set of travel parameters for the platoon that prescribe travel characteristics for vehicles in the platoon comprise a travel speed for the platoon.

11. A computing system, comprising:
one or more processors; and
one or more computer-readable media having instructions stored thereon that, when executed by the one or more processors, cause the one or more processors to perform operations comprising:
instructing a first vehicle traveling on a roadway to form a platoon with a second vehicle traveling on the roadway;
obtaining information about a travel route planned for the first vehicle;
determining, based on the information about the travel route planned for the first vehicle, a predicted outcome of the first vehicle's travel along at least a portion of the travel route, wherein the predicted outcome relates to an amount of power consumed by the first vehicle;
determining, based on the predicted outcome of the first vehicle's travel along at least a portion of the travel route, a set of travel parameters for the platoon that prescribe travel characteristics for vehicles in the platoon; and
directing the first and second vehicles to travel in the platoon according to the set of travel parameters.

12. The computing system of claim 11, wherein determining the predicted outcome of the first vehicle's travel along at least a portion of the travel route comprises determining a rate of power consumption of the first vehicle.

13. The computing system of claim 12, wherein the operations further comprise determining whether to form the platoon or change a configuration of the platoon based on the rate of power consumption of the first vehicle.

14. The computing system of claim 11, wherein the first vehicle and the second vehicle are cargo vehicles.

15. The computing system of claim 11, wherein the first vehicle is a lorry or a flatbed trailer-truck.

16. The computing system of claim 11, wherein directing the first and second vehicles to travel in the platoon according to the set of travel parameters comprises transmitting instructions specifying travel parameters to the first and second vehicles over a wireless channel.

17. The computing system of claim 11, wherein directing the first and second vehicles to travel in the platoon according to the set of travel parameters comprises sending instructions to the first and second vehicles to form the platoon or change a configuration of the platoon.

18. The computing system of claim 11, wherein the first and second vehicles are configured, while traveling in the platoon, to maintain a target separation distance between the vehicles and to coordinate at least one of acceleration and braking of the vehicles.

19. The computing system of claim 11, wherein the first and second vehicles are configured, while traveling in the platoon, to exchange sensor data detected by respective sensors on the vehicles with the other vehicle.

20. The computing system of claim 11, wherein the set of travel parameters for the platoon that prescribe travel characteristics for vehicles in the platoon comprise a travel speed for the platoon.

* * * * *